(12) United States Patent
Shinomiya et al.

(10) Patent No.: US 10,634,625 B2
(45) Date of Patent: Apr. 28, 2020

(54) TRANSFER SYSTEM AND TRANSFER METHOD

(71) Applicant: Sumitomo Chemical Company, Limited, Tokyo (JP)

(72) Inventors: Yoshitaka Shinomiya, Daegu (KR); Yasuyuki Kondo, Niihama (JP); Koji Kashu, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 65 days.

(21) Appl. No.: 15/938,404

(22) Filed: Mar. 28, 2018

(65) Prior Publication Data

US 2018/0284038 A1 Oct. 4, 2018

(30) Foreign Application Priority Data

Mar. 31, 2017 (JP) ................. 2017-070637
Jun. 30, 2017 (JP) ................. 2017-129783

(51) Int. Cl.
| | |
|---|---|
| *H01M 2/14* | (2006.01) |
| *B25J 15/00* | (2006.01) |
| *G01N 23/18* | (2018.01) |
| *H01M 10/42* | (2006.01) |
| *G01N 23/083* | (2018.01) |

(52) U.S. Cl.
CPC .......... *G01N 23/18* (2013.01); *B25J 15/0019* (2013.01); *B25J 15/0047* (2013.01); *H01M 2/145* (2013.01); *H01M 10/4285* (2013.01); *G01N 23/083* (2013.01)

(58) Field of Classification Search
CPC ... H01M 2/145; B25J 15/0047; B25J 15/0019
See application file for complete search history.

(56) References Cited

U.S. PATENT DOCUMENTS

| | | | |
|---|---|---|---|
| 8,567,453 B2 * | 10/2013 | Donnay ............... | B25J 15/0047 141/38 |
| 2015/0019003 A1 * | 1/2015 | Murakami ........... | B25J 15/0047 901/31 |
| 2017/0025658 A1 * | 1/2017 | Shi ........................ | H01M 2/145 |

FOREIGN PATENT DOCUMENTS

JP 5673621 B2 2/2015

* cited by examiner

*Primary Examiner* — Gerald McClain
(74) *Attorney, Agent, or Firm* — Panitch Schwarze Belisario & Nadel LLP

(57) ABSTRACT

A transfer system includes a robot arm configured to hold a core, which is tubular, of at least one separator roll from a side of a first side surface of the at least one separator roll. The at least one separator roll includes the core and a separator, wound around an outer circumferential surface of the core. The robot arm is further configured to take out the at least one separator roll from a rack. A defect inspection device is configured to hold the core from a side of a second side surface of the at least one separator roll, receive the at least one separator roll from the robot arm, and inspect, for a defect, the at least one separator roll thus received.

7 Claims, 15 Drawing Sheets

TRANSFER SYSTEM AND TRANSFER METHOD

This Nonprovisional application claims priority under 35 U.S.C. § 119 on Patent Application No. 2017-070637 filed in Japan on Mar. 31, 2017 and Patent Application No. 2017-129783 filed in Japan on Jun. 30, 2017, the entire contents of which are hereby incorporated by reference.

TECHNICAL FIELD

The present invention relates to a separator roll transfer system and a separator roll transfer method.

BACKGROUND ART

A lithium-ion secondary battery includes a positive electrode and a negative electrode that are separated by a porous separator. Lithium-ion secondary batteries are produced by use of a separator roll including a cylindrical core and such a separator wound around the core. A separator which is being produced may have a defect due to, for example, adhesion thereto of a foreign object. This necessitates inspecting the separator for a defect. Particularly in a case where a separator has a defect caused by an electrically conductive foreign object such as metal, the foreign object may cause a short circuit inside the lithium-ion secondary battery.

Patent Literature 1 discloses a defect inspection device configured to (i) emit visible light and infrared light to a surface of a sheet which is being transferred by a transfer roller and (ii) determine, in accordance with image captured data corresponding to the amount of each of the visible light reflected and the infrared light reflected, whether a defect on the surface of the sheet is caused by metal.

CITATION LIST

Patent Literature

[Patent Literature 1]
Japanese Patent No. 5673621

SUMMARY OF INVENTION

Technical Problem

Separator rolls are produced by (i) slitting (cutting) a single separator original sheet into a plurality of separators in accordance with the size of lithium-ion secondary batteries to be used and (ii) winding each of the plurality of separators around a core.

To a separator original sheet which is being slit, a metal foreign object resulting from a metal blade easily adheres. Thus, it is preferable to inspect, for a defect, a separator produced by slitting the original sheet. A metal foreign object results also from, for example, a sliding part of a transfer roller. Thus, it is preferable to inspect, for a defect, a separator which has been wound around a core into a separator roll and then will not come into contact with a roller.

The defect inspection device disclosed in Patent Literature 1 is unfortunately incapable of inspecting, for a foreign object that has been trapped inside the separator roll, the separator which is once wound around the core.

The present invention has been made in view of the problem, and an object of the present invention is to provide a separator roll transfer system and a separator roll transfer method each of which makes it possible to (i) efficiently transfer a separator roll while preventing adhesion of a foreign object to the separator roll and (ii) carry out a predetermined process with respect to the separator roll.

Solution to Problem

In order to attain the object, a transfer system in accordance with an aspect of the present invention includes: a robot arm configured to hold a core, which is tubular, of at least one separator roll from a side of a first side surface of the at least one separator roll, the at least one separator roll including the core and a separator, wound around an outer circumferential surface of the core, for use in a battery, and take out, from a placement member on which to place the at least one separator roll, the at least one separator roll which is placed on the placement member; and a processor configured to hold the core from a side of a second side surface, opposite the first side surface, of the at least one separator roll, receive the at least one separator roll from the robot arm, and carry out a predetermined process with respect to the at least one separator roll thus received.

In order to attain the object, a transfer method in accordance with an aspect of the present invention includes: causing a robot arm to hold a core, which is tubular, of at least one separator roll from a side of a first side surface of the at least one separator roll, the at least one separator roll including the core and a separator, wound around an outer circumferential surface of the core, for use in a battery, and take out, from a placement member on which to place the at least one separator roll, the at least one separator roll which is placed on the placement member; and holding the core from a side of a second side surface, opposite the first side surface, of the at least one separator roll, receiving the at least one separator roll from the robot arm, and carrying out a predetermined process with respect to the at least one separator roll thus received.

Advantageous Effects of Invention

An aspect of the present invention yields an effect of providing a separator roll transfer system and a separator roll transfer method each of which makes it possible to (i) efficiently transfer a separator roll while preventing adhesion of a foreign object to the separator roll and (ii) carry out a predetermined process with respect to the separator roll.

BRIEF DESCRIPTION OF DRAWINGS (a) and (b) of FIG. 1 each schematically illustrate a configuration of a slitting apparatus in accordance with Embodiment 1.

(a) through (e) of FIG. 2 each schematically illustrate a configuration of a separator roll in accordance with Embodiment 1.

(a) and (b) of FIG. 3 each schematically illustrate a configuration of a transfer system in accordance with Embodiment 1.

FIG. 4 schematically shows an example of a configuration of a defect inspection device in accordance with Embodiment 1.

(a) through (d) of FIG. 5 each schematically illustrate a configuration of a robot arm in accordance with Embodiment 1 and an operating state of the robot arm.

(a) through (d) of FIG. 6 each schematically illustrate a configuration of a variation of the robot arm of each of (a) through (d) of FIG. 5 and an operating state of the variation.

(a) and (b) of FIG. 7 each schematically illustrate a configuration of another variation of the robot arm and an operating state of the another variation.

FIG. 8 is a side view showing a variation of a holding member of a rack illustrated in FIG. 3.

(a) through (c) of FIG. 9 each schematically illustrate a configuration of a transfer system in accordance with Embodiment 2.

(a) and (b) of FIG. 10 each schematically illustrate a configuration of a transfer system in accordance with Embodiment 3.

(a) through (c) of FIG. 11 each schematically illustrate a holding mechanism of a pre-inspection rack illustrated in FIG. 10.

(a) and (b) of FIG. 12 are front views each illustrating an operating state of a lifter configured to fix the pre-inspection rack.

FIG. 13 is a top view schematically illustrating a configuration of a transfer system in accordance with Embodiment 4.

FIG. 14 schematically illustrates the transfer system of FIG. 13 from a different angle.

DESCRIPTION OF EMBODIMENTS

Embodiment 1

An embodiment of the present invention is described below with reference to FIGS. 1 through 6. The description of Embodiment 1 takes, as an example, a case where a transfer system in accordance with an aspect of the present invention is used to inspect a separator roll for a defect.

(Process of Producing Separator Roll)

Figure 1:
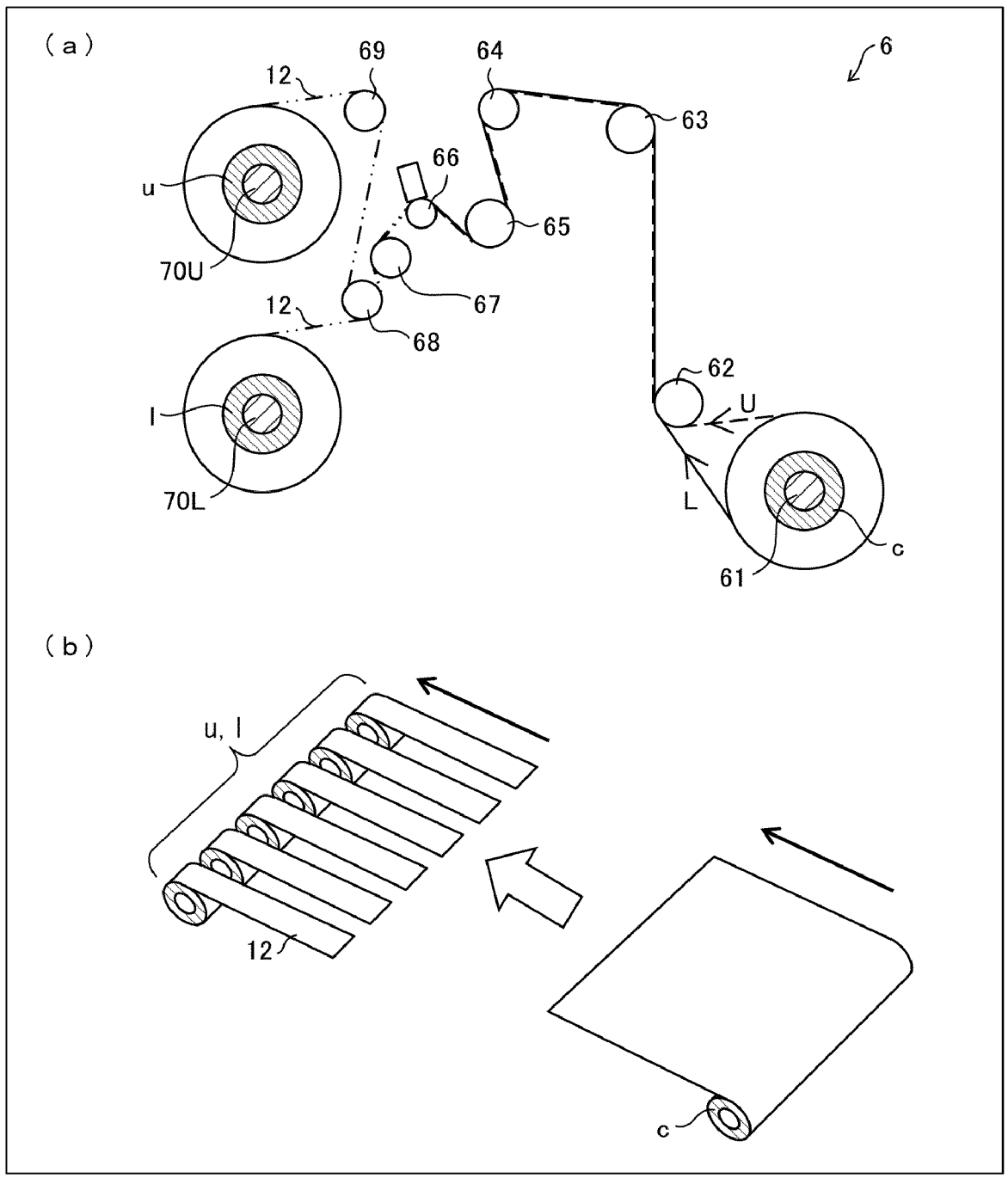

First, the following description discusses a process of producing a separator roll in accordance with Embodiment 1. FIG. 1 schematically illustrates a configuration of a slitting apparatus 6 configured to slit a separator. Specifically, (a) of FIG. 1 schematically illustrates a configuration of an entirety of the slitting apparatus 6, and (b) of FIG. 1 schematically illustrates a configuration of an original sheet which has not been slit and a configuration of the original sheet which has been slit.

A separator 12 is a porous film or a nonwoven fabric that allows movement of lithium ions between a positive electrode and a negative electrode of, for example, a lithium-ion secondary battery (battery) while separating the positive electrode and the negative electrode. The separator 12 contains, for example, polyolefin (e.g., polyethylene or polypropylene) as a material thereof.

The separator 12 can include a porous film and a functional layer provided on a surface of the porous film. Examples of the functional layer include a heat-resistant layer that allows the porous film to be resistant to heat, and an adhesive layer that allows the porous film to be adhesive. The heat-resistant layer contains, for example, wholly aromatic polyamide (aramid resin) or polyvinylidene fluoride (fluororesin) as a material thereof.

That is, the separator 12 can be a laminated porous film including (i) a porous film containing polyolefin and (ii) a functional layer such as a heat-resistant layer or an adhesive layer. The functional layer contains resin. Examples of the resin include polyolefins such as polyethylene and polypropylene; fluorine-containing polymers such as polyvinylidene fluoride (PVDF), polytetrafluoroethylene, and a vinylidene fluoride-hexafluoropropylene copolymer; aromatic polyamides; rubbers such as a styrene-butadiene copolymer and a hydride thereof, a methacrylate ester copolymer, an acrylonitrile-acrylic ester copolymer, and a styrene-acrylic ester copolymer; polymers having a melting point or a glass transition temperature of not less than 180° C.; and water-soluble polymers such as polyvinyl alcohol, polyethylene glycol, cellulose ether, sodium alginate, polyacrylic acid, polyacrylamide, and polymethacrylic acid. The functional layer can also contain a filler made of an organic substance or an inorganic substance. Examples of an inorganic filler include fillers made of inorganic oxides such as silica, magnesium oxide, alumina, aluminum hydroxide, and boehmite. Alumina has crystal forms such as α-alumina, β-alumina, γ-alumina, and θ-alumina, and any of the crystal forms can be used. The above resins can be used alone or in combination of two or more kinds, and the above fillers can be used alone or in combination of two or more kinds. In a case where the functional layer contains a filler, the filler can be contained in an amount of not less than 1% by volume and not more than 99% by volume of the functional layer.

The separator 12 preferably has a width (hereinafter referred to as a "product width") suitable for an application product such as a lithium-ion secondary battery. However, for the purpose of achievement of productivity improvement, first, a separator is produced so as to have a width that is not less than the product width. Then, the separator which has been produced so as to have a width that is not less than the product width is cut (slit) so as to have the product width.

The expression "width of a/the separator" refers to a length of the separator which length extends in a direction substantially perpendicular to each of a machine direction and a thickness direction of the separator. The following description uses the term "original sheet" to refer to a wide separator that has not been slit. Further, expressions such as "slitting" mean making a slit in a separator original sheet in the machine direction (i.e., a direction in which a film is transferred during the production), and expressions such as "cutting" mean cutting a separator original sheet in a transverse direction. The transverse direction refers to a direction that is substantially perpendicular to each of the machine direction and the thickness direction of the separator, and the transverse direction is synonymous with a width direction of the separator.

The slitting apparatus 6 is an apparatus configured to slit an original sheet. The slitting apparatus 6 includes a columnar wind-off roller 61 that is rotatably supported, rollers 62 to 69, and wind-up rollers 70U and 70L.

In the slitting apparatus 6, a cylindrical core c around which an original sheet is wound is fit on the wind-off roller 61.

The original sheet is wound off from the core c to a route U or L. The original sheet which has been wound off is transferred to the roller 68 via the rollers 63 to 67. While being transferred from the roller 67 to the roller 68, the original sheet is slit into a plurality of separators 12 (a slitting step). Note that the slitting apparatus 6 includes a slitting device (not illustrated in FIG. 1) provided near the roller 68 and configured to slit the original sheet into the plurality of separators 12.

After the slitting step, some of the plurality of separators 12 which has been produced by slitting the original sheet are each wound around a cylindrical core u fit on the wind-up roller 70U, whereas the other(s) of the plurality of separators 12 are each wound around a cylindrical core l fit on the wind-up roller 70L (a separator winding step).

Note that a separator 12 that has been produced by slitting the original sheet and then wound around a core (bobbin) in a roll shape is referred to as a "separator roll". According to Embodiment 1, a separator roll that has been produced in the separator winding step is inspected for a foreign object inside the separator roll in a defect inspection step described later. During the slitting step described earlier, a foreign object is easily produced (e.g., a metal slitting blade is partially chipped and a resultant chip adheres to a surface of the separator 12 produced by slitting the original sheet). Thus, the defect inspection step is preferably carried out after the slitting step.

A plurality of separator rolls which has been found, in the defect inspection step, to be non-defective is packed together in a package later in a packaging step so as to be stored and shipped.

(Configuration of Separator Roll)

Figure 2:
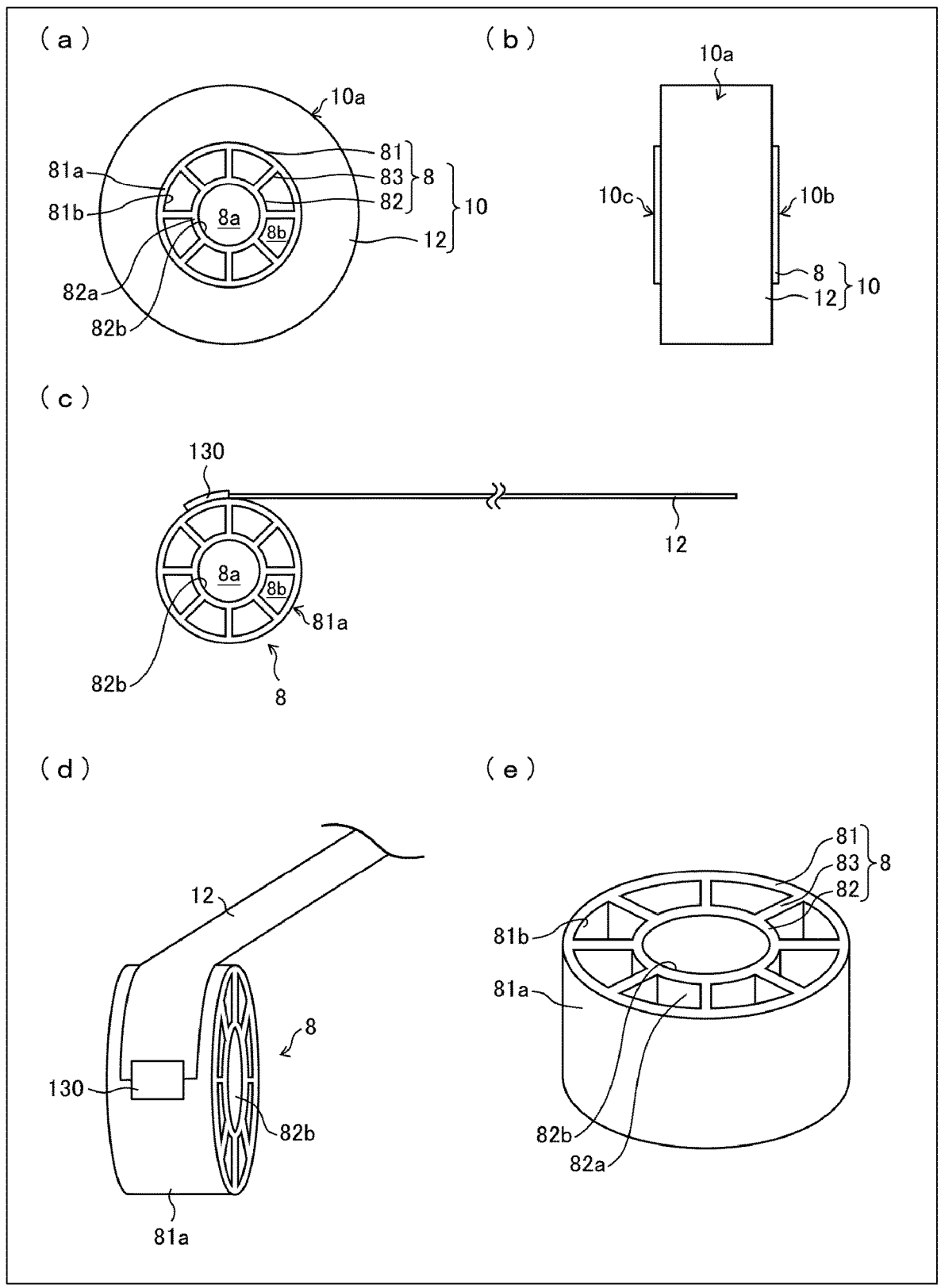

The following description discusses a configuration of a separator roll in accordance with Embodiment 1. FIG. 2 schematically illustrates a configuration of a separator roll 10 in accordance with Embodiment 1. Specifically, (a) of FIG. 2 illustrates a separator 12 which has not been wound off from a core 8. (b) of FIG. 2 illustrates the separator 12 of (a) of FIG. 2 from a different angle. (c) of FIG. 2 illustrates the core 8 from which the separator 12 has been wound off. (d) of FIG. 2 illustrates the separator 12 of (c) of FIG. 2 from a different angle. (e) of FIG. 2 illustrates the core 8 from which the separator 12 has been wound off and removed.

As illustrated in (a) and (b) of FIG. 2, the separator roll 10 includes the core 8 and the separator 12 wound around the core 8. The separator 12 has been produced by slitting the original sheet as described earlier. Among surfaces of the separator roll 10, an outer circumferential surface of the separator 12 wound in the roll shape is referred to as an outer circumferential surface 10a, and one and the other of side surfaces that face each other across the outer circumferential surface 10a are referred to as a first side surface 10b and a second side surface 10c, respectively.

The core 8 includes an outer cylindrical member (outer tubular member) 81, an inner cylindrical member (inner tubular member) 82, and a plurality of ribs 83. The core 8 is identical to the cores u and l mentioned earlier.

The outer cylindrical member 81 is a cylindrical member having an outer circumferential surface 81a around which to wind the separator 12. The inner cylindrical member 82 is a cylindrical member that is provided on a side of an inner circumferential surface 81b of the outer cylindrical member 81 and has a smaller diameter than the outer cylindrical member 81. The plurality of ribs 83 are support members that (i) extend from an outer circumferential surface 82a of the inner cylindrical member 82 to the inner circumferential surface 81b of the outer cylindrical member 81 and (ii) support the outer cylindrical member 81 from the side of the inner circumferential surface 81b. According to Embodiment 1, eight ribs 83 in total are provided at regular intervals in a circumferential direction of the core 8.

The core 8 has a first through hole 8a and a plurality of (in Embodiment 1, eight) second through holes 8b. The first through hole 8a is provided at a center of the core 8 and is defined by the inner cylindrical member 82 (the inner circumferential surface 82b of the inner cylindrical member 82). The plurality of second through holes 8b is provided so as to surround the first through hole 8a and is defined by the outer cylindrical member 81, the inner cylindrical member 82, and the ribs 83.

As illustrated in (c) and (d) of FIG. 2, the separator 12 has an end attached to the core 8 with an adhesive tape 130. Specifically, the separator 12 has an end fixed to the outer circumferential surface 81a of the core 8 (outer cylindrical member 81) by use of the adhesive tape 130. An end of the separator 12 can be fixed to the outer circumferential surface 81a not only by using the adhesive tape 130 but also by, for example, applying an adhesive directly to the end of the separator 12 or using a clip.

As illustrated in (e) of FIG. 2, the core 8 is preferably configured such that central axes of the outer cylindrical member 81 and the inner cylindrical member 82 substantially coincide with each other. Note, however, that a configuration of the core 8 is not limited to the above configuration. Note also that the dimensions such as the thickness, the width, and the radius of each of the outer cylindrical member 81 and the inner cylindrical member 82 can be appropriately designed in accordance with, for example, a type of the separator 12 to be wound.

The ribs 83 are provided at regular intervals, at respective locations dividing the circumference of the core into eight equal parts, so as to substantially perpendicular to the outer cylindrical member 81 and the inner cylindrical member 82. Note, however, the number of ribs 83 and/or intervals at which to provide the ribs 83 is/are not limited to the above.

The core 8 contains ABS resin as a material thereof. Note, however, that the material of the core 8 is not limited to ABS resin. Examples of resin that the core 8 can contain as a material thereof include not only ABS resin but also polyethylene resin, polypropylene resin, polystyrene resin, and vinyl chloride resin. Note, however, the material of the core 8 is preferably a non-metal material.

(Configuration of Transfer System)

The following description discusses a configuration of a transfer system in accordance with Embodiment 1. (a) and (b) of FIG. 3 each schematically illustrate a configuration of a transfer system 1 in accordance with Embodiment 1. Specifically, (a) of FIG. 3 is a perspective view of the transfer system 1, and (b) of FIG. 3 is a side view of the transfer system 1.

The transfer system 1 is a system configured to transfer the separator roll 10 and carry out various processes. According to Embodiment 1, the transfer system 1 is a system configured to inspect the separator roll 10 for a defect. More specifically, the transfer system 1 is a system configured to inspect, for a foreign object, the separator 12 wound around the core 8.

Figure 3:
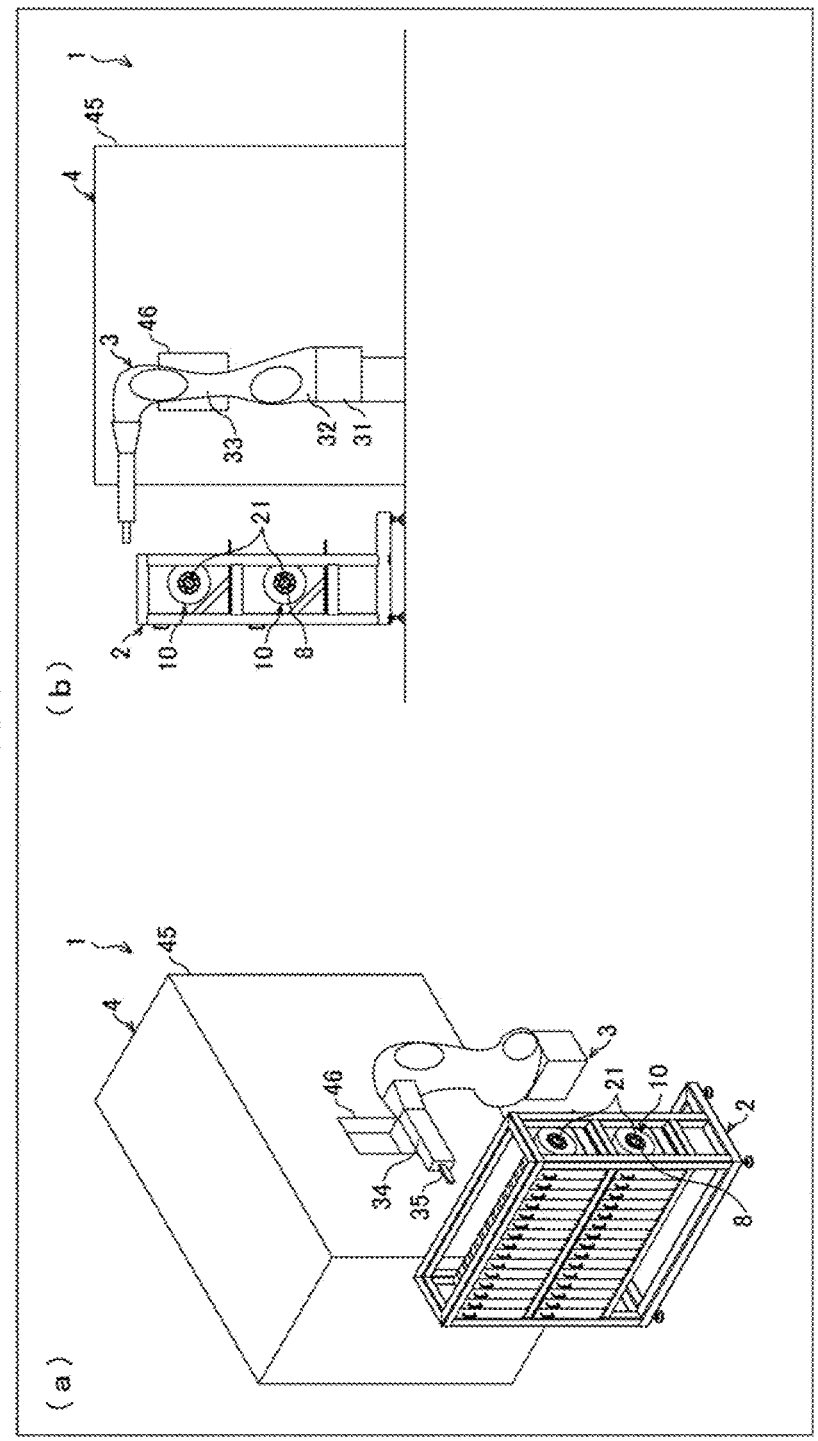

As illustrated in FIG. 3, the transfer system 1 includes a rack (placement member) 2, a robot arm 3, and a defect inspection device (processor, X-ray inspection machine) 4.

(Rack)

The rack 2 is a placement member on which to place a plurality of separator rolls 10. On the rack 2, a separator roll 10 which has not been inspected and a separator roll 10 which has been inspected are placed. For example, the rack 2 has two upper and lower stages on which (i) the separator roll 10 which has not been inspected and (ii) the separator roll 10 which has been inspected, respectively, can be separately placed.

The rack 2 includes a plurality of holding members 21 configured to hold the plurality of separator rolls 10. The rack 2 holds a separator roll 10 by inserting a holding member 21 in the first through hole 8a of the core 8 from the side of the second side surface 10c of the separator roll 10. With the configuration, the rack 2 holds each separator roll 10, without coming into direct contact with the separator 12, while causing the outer circumferential surface 10a of the separator roll 10 to face the robot arm 3.

In order that the robot arm 3 can easily take out a separator roll 10 from the rack 2, the rack 2 can be provided with the plurality of holding members 21 so that the plurality of separator rolls 10 are placed on the rack 2 so as to be widely spaced from each other.

The rack 2 can include an anti-rotation member configured to prevent rotation of each of the plurality of separator rolls 10 held by the plurality of holding members 21. Examples of the anti-rotation member include an angle member (see FIG. 11) to be inserted in a second through hole 8b of the core 8 from the side of the second side surface 10c of a separator roll 10. To the outer circumferential surface 10a of the separator roll 10, a label is ordinarily attached which indicates (i) product information on the separator 12 and/or (ii) a character or a numeral denoting various pieces of information on the separator roll 10 (e.g., a wound diameter (outer diameter) of the separator roll 10), or a code (a bar code, a QR code (Registered Trademark)) representing those pieces of information. The rack 2 which includes an anti-rotation member makes it possible to prevent a separator roll 10 held by a holding member 21 from rotating during, for example, movement of the rack 2. Thus, an orientation (location) of the label can be kept constant at all times. This makes it possible to easily read the label.

The rack 2 can also be provided with, for example, a wheel so that the rack 2 can be easily moved.

The rack 2 can also be provided with a dustproof cover configured to prevent a foreign object from adhering to a separator roll 10 which is placed on the rack 2. The configuration makes it possible to prevent a foreign object from adhering to the separator roll 10 during, for example, movement of the rack 2. Examples of such a dustproof cover include clean cloth that is used in a clean booth, an (anti-static) plastic sheet, and a metal plate.

Further, a separator roll 10 can be transferred between the rack 2 and the robot arm 3 by entry of a hand part of the robot arm 3 into a frame of the rack 2. Alternatively, the separator roll 10 can be transferred between the rack 2 and the robot arm 3 outside the frame by a mechanism provided in a holding member 21 and configured to take out the separator roll 10 to an outside of the frame.

(Robot Arm)

The robot arm 3 is a device configured to transfer a separator roll 10 between the rack 2 and the robot arm 3. The robot arm 3 includes a base 31, a pedestal 32, a first arm part 33, a second arm part 34, and a hand part 35.

The pedestal 32 is provided on the base 31 so as to be pivotable on an axis that extends in a vertical direction. The first arm part 33 is provided on an upper side (on a side of a first end opposite a second end at which the base 31 is located) of the pedestal 32. The first arm part 33 is axially supported by the pedestal 32 so as to be rockable forward and backward.

The second arm part 34 is provided on a tip side (on a side of a first end opposite a second end at which the pedestal 32 is located) of the first arm part 33. The second arm part 34 is axially supported by the first arm part 33 so as to be rockable upward and downward.

The hand part 35, which grips the separator roll 10, is provided on a tip side (on a side of a first end opposite a second end at which the first arm part 33 is located) of the second arm part 34. The hand part 35 is axially supported by the second arm part 34 so as to be rockable and rotatable.

The robot arm 3 can freely change its posture by pivoting or rotating each part of the robot arm 3 by controlling operation of an actuator configured to drive each joint of the robot arm 3.

The robot arm 3 holds the core 8 from the side of the first side surface 10b of the separator roll 10. Since the holding member 21 of the rack 2 and the robot arm 3 thus hold the core 8 from the sides of the respective different side surfaces of the separator roll 10, the separator roll 10 can be efficiently transferred between the rack 2 and the robot arm 3.

Note that it is possible to provide, for example, a joint part and a sliding part of the robot arm 3 with an antiscattering cover configured to prevent scattering of a dusted metal foreign object. Note also that an O-ring seal can be provided on a joint axis or a low-dust grease can be applied to the joint axis. Further, the robot arm 3 can additionally include a mechanism configured to suck a metal foreign object that has been dusted in the robot arm 3.

Embodiment 1 uses a vertical articulated robot arm as the robot arm 3. Alternatively, Embodiment 1 can also use a horizontal articulated robot arm, an orthogonal robot arm, a parallel link robot arm, or the like as the robot arm 3. Note that the robot arm 3 will be specifically described later.

(Defect Inspection Device)

A defect inspection device 4 is a device configured to inspect, for a foreign object, the separator 12 wound around the core 8 in the separator roll 10. The defect inspection device 4 inspects the separator 12 for a foreign object by, for example, emitting an electromagnetic wave (electromagnetic radiation) to the separator roll 10.

In order that the electromagnetic wave which is used by the defect inspection device 4 does not leak outside, the defect inspection device 4 is covered with a wall 45 that contains, for example, lead and prevents an electromagnetic wave from easily passing therethrough. The wall 45 is partially provided with an opening 46 provided with a door (not illustrated in FIG. 3), which is openable for the separator roll 10 to be carried in and out by the robot arm 3 via the opening 46.

Figure 4:
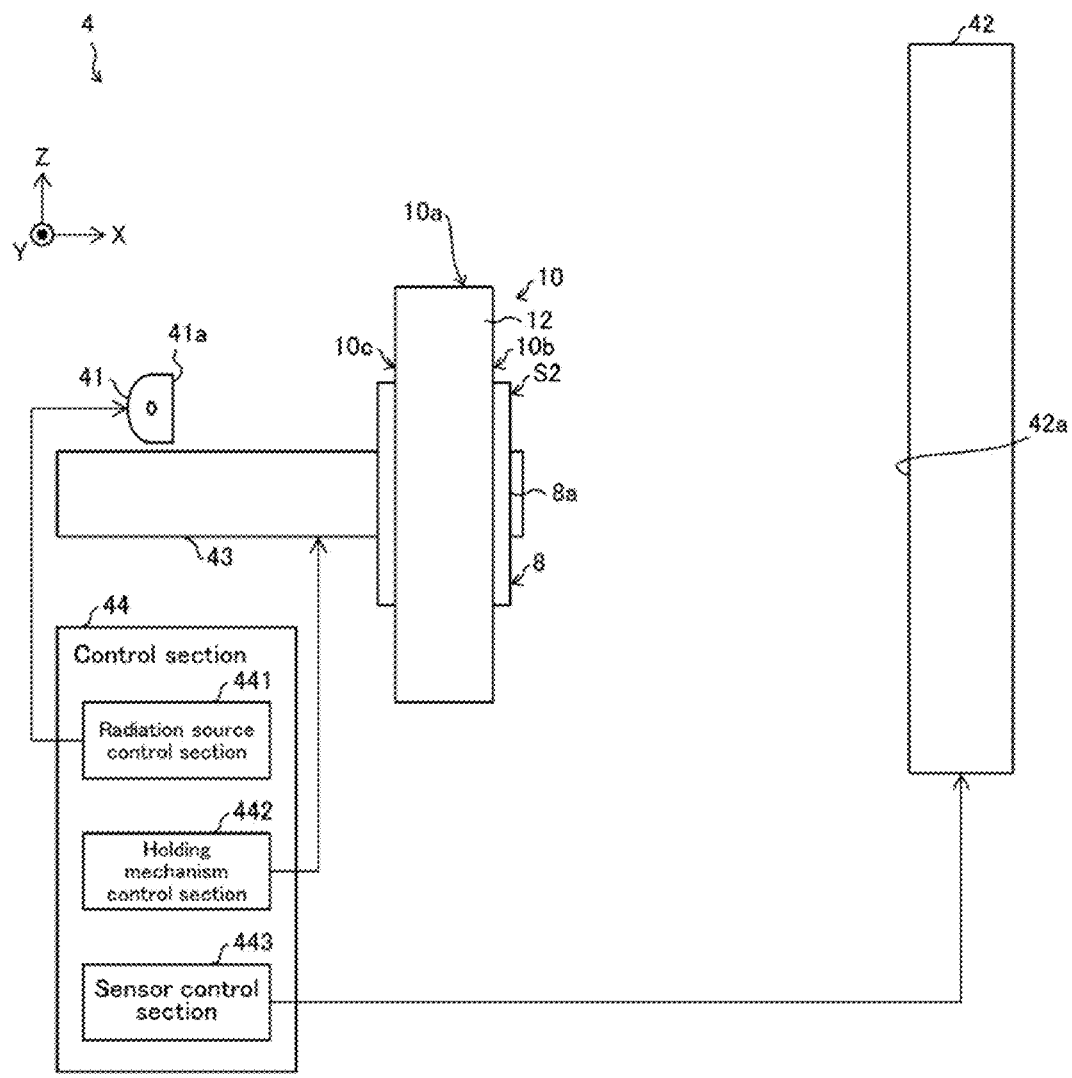

FIG. 4 schematically shows an example of a configuration of the defect inspection device 4 in accordance with Embodiment 1. As illustrated in FIG. 4, the defect inspection device 4 includes (i) a radiation source section 41 configured to emit an electromagnetic wave, (ii) a sensor section 42 configured to detect the electromagnetic wave emitted by the radiation source section 41, and (iii) a holding mechanism 43 configured to hold the separator roll 10. The defect inspection device 4 further includes a control section 44 configured to control driving of an entirety of the defect inspection device 4.

According to Embodiment 1, the radiation source section 41 emits an electromagnetic wave in an X-axis direction (left-right direction of FIG. 4), and the vertical direction (up-down direction of FIG. 4), which is perpendicular to an X-axis, is a Z-axis direction.

The radiation source section 41 emits, to the separator roll 10, an electromagnetic wave that is transmitted, in a width direction of the separator 12, through the separator 12 wound around the core 8. Examples of such an electromagnetic wave include electromagnetic waves each having a wavelength falling within a range of 1 pm to 10 nm. Among these electromagnetic waves, the electromagnetic wave which is emitted by the radiation source section 41 is preferably an X ray. This makes it possible to achieve the defect inspection device 4 which is inexpensive and easy to use.

An exit surface 41a of the radiation source section 41, through which exit surface 41a the electromagnetic wave emitted by the radiation source section 41 exits, is provided so as to face a detection surface 42a of the sensor section 42 across the separator roll 10 which has been set on the holding mechanism 43.

The sensor section 42 is a detector capable of detecting, at the detection surface 42a, the electromagnetic wave emitted by the radiation source section 41. The sensor section 42 which has detected the electromagnetic wave emitted by the radiation source section 41, supplies, to a sensor control section 443 of the control section 44, an electric signal corresponding to an intensity of the electromagnetic wave which has been detected. The sensor control section 443 which has acquired the electric signal from the sensor section 42 generates a captured image in accordance with the electric signal.

The sensor section 42 only needs to be a detector capable of detecting an electromagnetic wave having a wavelength range identical to a wavelength range of the electromagnetic wave emitted by the radiation source section 41. For example, in a case where the radiation source section 41 is configured to emit an X ray, the sensor section 42 only needs to be a detector capable of detecting an X ray. Meanwhile, in a case where the radiation source section 41 is configured to emit a γ ray, the sensor section 42 only needs to be a detector capable of detecting a γ ray.

Embodiment 1 assumes that the sensor section 42 is capable of detecting an X ray and is a flat-panel detector (FPD) including pixels provided in a matrix pattern. The sensor section 42 is an FPD including, for example, a 1500 by 1500 or 2000 by 2000 matrix of pixels each of which has a size of, for example, 20 μm to 2000 μm selected as an optimum size in accordance with a size of a foreign object to be detected.

The detection surface 42a of the sensor section 42 can have a smaller area than a corresponding side surface of the separator roll 10. This is because Embodiment 1 makes it possible to obtain a captured image of an entirety of the separator roll 10 by (i) rotating the separator roll 10 and capturing, one after another, respective images of parts of the separator 12 which has been wound around the core 8 so as to be multilayered and ring-shaped, (ii) extracting necessary regions from those captured images, and (iii) connecting the necessary regions.

The holding mechanism 43 is configured to hold the separator roll 10, which is to be inspected, so as to be capable of moving the separator roll 10 in each of the X-axis direction and the Z-axis direction. That is, the holding mechanism 43 moves the separator roll 10 relative to the radiation source section 41. The holding mechanism 43 can be configured to be capable of moving the separator roll 10 also in a Y-axis direction (i.e., a direction in which FIG. 4 is away from or closer to a viewer thereof), which is perpendicular to each of the X-axis direction and the Z-axis direction.

The holding mechanism 43, which is shaped so as to extend in the X-axis direction, holds the separator roll 10 so that the separator roll 10 can rotate on an axis parallel to the X-axis. Specifically, the defect inspection device 4 holds the separator roll 10 by inserting the holding mechanism 43 in the first through hole 8a from the side of the second side surface 10c of the separator roll 10. The configuration allows the defect inspection device 4 to hold the separator roll 10 from the side of the first side surface 10b without coming into direct contact with the separator 12.

In the defect inspection device 4, the separator roll 10 is set so that at least a part of the separator 12 wound around the core 8 is present between the radiation source section 41 and the sensor section 42.

From the viewpoint of prevention of generation of a metal foreign object, the holding mechanism 43 preferably has at least a sliding part made of resin. The resin is not limited in kind. Examples of the resin include general-purpose resins such as polyethylene resin, polypropylene resin, polystyrene resin, vinyl chloride resin, acrylic resin, ABS, and polyester; engineering plastics such as polyacetal, polyamide, polycarbonate, and modified polyphenylene ether; and super engineering plastics such as polyalylate, polysulfone, polyether sulfone, polyphenylene sulfide, polyether ether ketone, polyimide, and polyetherimide.

Among the above resins, the resin, which is used for the sliding part, is preferably an abrasion-resistant super engineering plastic, and more preferably polyether ether ketone.

In a case where the separator roll 10 is set on the holding mechanism 43, the defect inspection device 4 is configured such that the radiation source section 41, the separator roll 10, and the sensor section 42 are arranged in this order in the X-axis direction. Of the side surfaces of the separator roll 10 which is set on the holding mechanism 43, the second side surface 10c faces the exit surface 41a of the radiation source section 41, and the first side surface 10b faces the detection surface 42a of the sensor section 42.

The control section 44 is configured to control driving of the entirety of the defect inspection device 4, the driving including driving of the radiation source section 41, driving of the sensor section 42, and driving of the holding mechanism 43. Specifically, the control section 44 includes (i) a radiation source control section 441 configured to control driving of the radiation source section 41, (ii) a holding mechanism control section 442 configured to control driving of the holding mechanism 43, and (iii) a sensor control section 443 configured to control driving of the sensor section 42 and obtain a captured image based on detection information from the sensor section 42.

The defect inspection device 4 thus configured captures an image of the separator 12, wound around the core 8 so as to be ring-shaped, by repeating operation of (i) rotating the separator roll 10, which is held by the holding mechanism 43, in a θ direction by a predetermined angle and (ii) capturing an image of the separator roll 10. By thus capturing an image of the entirety of the separator roll 10, extracting necessary regions from the image, and connecting the necessary regions, it is possible to obtain a captured image of the entirety of the separator roll 10. Further, by analyzing the captured image thus obtained, the defect inspection device 4 can inspect the separator 12 for a foreign object.

After the inspection of the separator roll 10, positional coordinates and a rotation angle of the holding mechanism 43 are preferably reset to initial positional coordinates and an initial rotation angle, respectively. This allows the separator roll 10 to be smoothly transferred between the holding mechanism 43 and the robot arm 3.

The defect inspection device 4 can further include a read sensor section configured to read, by, for example, using a laser or carrying out image processing, the above-described label attached to the separator roll 10. The defect inspection device 4 which includes the read sensor section is configured to (i) cause the read sensor section to read various pieces of information on the separator roll 10 (e.g., a product number of the separator roll 10 and the wound diameter of the separator roll 10) from the label attached to the separator roll 10 which has been carried into the defect inspection device 4 by the robot arm 3 and (ii) supply the various pieces of information thus read to the control section 44. The configuration allows the control section 44 to control, for example, the radiation source section 41 and the holding mechanism 43 in accordance with the various pieces of information supplied from the read sensor section. This makes it possible to suitably inspect the separator roll 10 for a foreign object in accordance with, for example, the wound diameter.

The defect inspection device 4 can also be configured to transmit, to a product information management system, which is an external device, information such as the product number of the separator roll 10 which has been inspected and an inspection result. This allows product information of each product to be collectively managed by use of the product information management system. Note that information that is transmitted from the defect inspection device 4 to the product information management system can include error information on the separator roll 10 in which a defect has been found. Examples of the error information include information on a failure caused by a foreign object, information on a failure caused by a contour (wound diameter) of the separator roll 10, and information on poor reading such as incapability to read, by use of the read sensor section, the label indicating various pieces of information.

Further, the defect inspection device 4 can transmit the inspection result to the robot arm 3. This allows the robot arm 3 to classify, in accordance with the inspection result, the separator roll 10 which has been inspected as either a non-defective product or a defective product and place the separator roll 10 thus classified on the rack 2.

(Details of Robot Arm)

Figure 5:
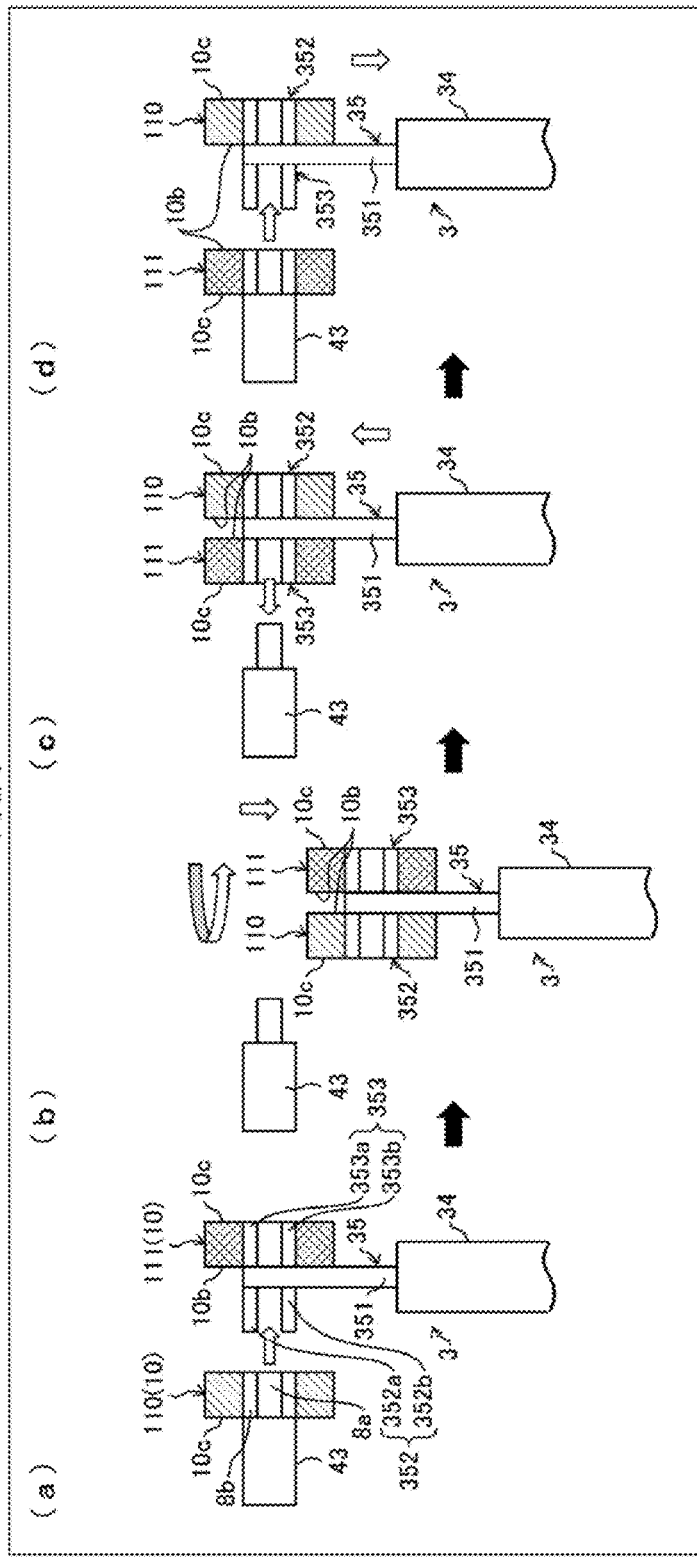

The robot arm 3 is specifically described below with reference to FIG. 5. (a) through (d) of FIG. 5 each schematically illustrate a configuration of the robot arm 3 and an operating state of the robot arm 3. Specifically, (a) of FIG. 5 illustrates an operating state of the robot arm 3 in which operating state while holding a separator roll 11 which has not been inspected, the robot arm 3 withdraws, from the holding mechanism 43 of the defect inspection device 4, a separator roll 110 which has been inspected. (b) of FIG. 5 illustrates an operating state of the robot arm 3 in which operating state the robot arm 3 causes the hand part 35 to rotate. (c) of FIG. 5 illustrates an operating state of the robot arm 3 in which operating state the robot arm 3 sets, on the holding mechanism 43, the separator roll 111 which has not been inspected. (d) of FIG. 5 illustrates an operating state of the robot arm 3 which has set, on the holding mechanism 43, the separator roll 111 which has not been inspected.

As illustrated in (a) through (d) of FIG. 5, the robot arm 3 is configured to be capable of simultaneously holding the plurality of separator rolls 10. The hand part 35 of the robot arm 3 has a basal part 351 which is shaped so as to have a longer side direction, and a first gripping part 352 and a second gripping part 353 each provided to the basal part 351.

The basal part 351 is connected to the second arm part 34, and the first gripping part 352 and the second gripping part 353 are provided to a tip (a first end opposite a second end at which the second arm part 34 is located) of the basal part 351 so as to be substantially symmetric with respect to the basal part 351. The configuration allows the robot arm 3 in accordance with Embodiment 1 to hold two separator rolls 10 in parallel.

The first gripping part 352 includes a pair of finger parts 352a and 352b. The first gripping part 352 holds the core 8 of a separator roll 10 by changing an interval between the pair of finger parts 352a and 352b. Similarly, the second gripping part 353 includes a pair of finger parts 353a and 353b. The second gripping part 353 holds the core 8 of a separator roll 10 by changing an interval between the pair of finger parts 353a and 353b. Note that neither the first gripping part 352 nor the second gripping part 353 necessarily needs to include a pair of finger parts and that each of the first gripping part 352 and the second gripping part 353 can include three or more finger parts.

From the viewpoint of prevention of generation of a metal foreign object, each of the first gripping part 352 and the second gripping part 353 preferably has a sliding part whose surface is made of resin. The resin is not limited in kind. Examples of the resin include general-purpose resins such as polyethylene resin, polypropylene resin, polystyrene resin, vinyl chloride resin, acrylic resin, ABS, and polyester; engineering plastics such as polyacetal, polyamide, polycarbonate, and modified polyphenylene ether; and super engineering plastics such as polyalylate, polysulfone, polyether sulfone, polyphenylene sulfide, polyether ether ketone, polyimide, and polyetherimide. Among the above resins, the resin is preferably a high-strength super engineering plastic, and more preferably polyether ether ketone.

Alternatively, each of the first gripping part 352 and the second gripping part 353 can be subjected to a urethane lining process. This makes it possible to achieve, without damaging the core 8, the first gripping part 352 and the second gripping part 353 each of which is less slippery and in each of which a metal foreign object is less likely to be generated.

Each of the first gripping part 352 and the second gripping part 353 has a hardness of preferably not less than A70 and not more than A90, and more preferably A70. The first gripping part 352 and the second gripping part 353 each of which has a hardness of more than A90 are so hard as to be slippery. Meanwhile, the first gripping part 352 and the second gripping part 353 each of which has a hardness of less than A70 easily cause poor chucking.

According to Embodiment 1, the robot arm 3 holds the separator roll 10 by inserting the first gripping part 352 (the pair of finger parts 352a and 352b) and the second gripping part 353 (the pair of finger parts 353a and 353b) in respective second through holes 8b of the core 8 from the side of the first side surface 10b of the separator roll 10. The defect inspection device 4 holds the separator roll 10 by inserting the holding mechanism 43 in the first through hole 8a of the core 8 from the side of the second side surface 10c of the separator roll 10.

As illustrated in (a) of FIG. 5, the robot arm 3 withdraws the separator roll 110 (separator roll 10 which has been inspected) from the holding mechanism 43 by causing the first gripping part 352 to hold, from the side of the first side surface 10b, the separator roll 110 which is held by the holding mechanism 43 from the side of the second side surface 10c.

Next, as illustrated in (b) of FIG. 5, the robot arm 3 which has withdrawn the separator roll 110 temporarily moves backward so as to cause the hand part 35 to rotate 180 degrees. This allows the separator roll 111 (separator roll 10 which has not been inspected) which is held by the second gripping part 353 to be located beside the holding mechanism 43.

Subsequently, as illustrated in (c) of FIG. 5, the robot arm 3 (i) moves forward to a place at which the separator roll 11 faces the holding mechanism 43 and (ii) sets the separator roll 111 on the holding mechanism 43. In this case, the robot arm 3 sets the separator roll 111 on the holding mechanism 43 by inserting the holding mechanism 43 in the first through hole 8a of the core 8 from the side of the second side surface 10c of the separator roll 111.

Then, as illustrated in (d) of FIG. 5, the robot arm 3 which has set the separator roll 111 on the holding mechanism 43 moves backward to an outside of the defect inspection device 4. After the robot arm 3 has moved to the outside of the defect inspection device 4, the door of the defect inspection device 4 is closed, and the separator roll 111 is inspected for a defect.

As described earlier, Embodiment 1 is configured such that the robot arm 3 holds the core 8 from the side of the first side surface 10b of the separator roll 10, and the holding mechanism 43 of the defect inspection device 4 holds the core 8 from the side of the second side surface 10c of the separator roll 10. Since the robot arm 3 and the defect inspection device 4 thus hold the core 8 from the sides of the respective different side surfaces of the separator roll 10, the separator roll 10 can be efficiently transferred between the robot arm 3 and the defect inspection device 4.

Further, since each of the robot arm 3 and the holding mechanism 43 of the defect inspection device 4 holds the core 8 of the separator roll 10, the separator roll 10 can be transferred without a direct contact of each of the robot arm 3 and the defect inspection device 4 with the separator 12 wound around the core 8.

In addition, the robot arm 3 holds the separator roll 10 by inserting the first gripping part 352 and the second gripping part 353 in the respective second through holes 8b of the core 8, and the defect inspection device 4 holds the separator roll 10 by inserting the holding mechanism 43 in the first through hole 8a of the core 8. Since the robot arm 3 and the defect inspection device 4 thus hold respective different parts of the core 8, the separator roll 10 can be more efficiently transferred between the robot arm 3 and the defect inspection device 4.

According to Embodiment 1, the robot arm 3 is configured to be capable of holding two separator rolls 10. Note, however, that the robot arm 3 in accordance with an aspect of the present invention does not necessarily need to be thus configured. The robot arm 3 can be configured to hold one (1) separator roll 10, or can be configured to hold three or more separator rolls 10.

Note that an aspect of the present invention can be configured such that (i) the first gripping part 352 and the second gripping part 353 of the robot arm 3 hold the first through hole 8a of the core 8 and (ii) the holding member 21 of the rack 2 and the holding mechanism 43 of the defect inspection device 4 hold the second through holes 8b of the core 8.

(Recap of Transfer System)

As described earlier, the transfer system 1 in accordance with Embodiment 1 includes: the robot arm 3 configured to hold the core 8, which is tubular, of the separator roll 10 from the side of the first side surface 10b of the separator roll 10, the separator roll 10 including the core 8 and the separator 12, wound around the outer circumferential surface 81a of the core 8, and take out, from the rack 2 on which to place the separator roll 10, the separator roll 10 which is placed on the rack 2; and the defect inspection device 4 configured to hold the core 8 from the side of the second side surface 10c, opposite the first side surface 10b, of the separator roll 10, receive the separator roll 10 from the robot arm 3, and carry out a predetermined process with respect to the separator roll 10 thus received.

Thus, according to Embodiment 1, it is possible to achieve the transfer system 1 which makes it possible to (i) efficiently transfer the separator roll 10 while preventing adhesion of a foreign object to the separator roll 10 and (ii) carry out a predetermined process with respect to the separator roll 10.

Note that the placement member on which to place the plurality of separator rolls 10 can be, for example, a belt conveyor instead of the rack 2.

(Variation 1)

Figure 6:
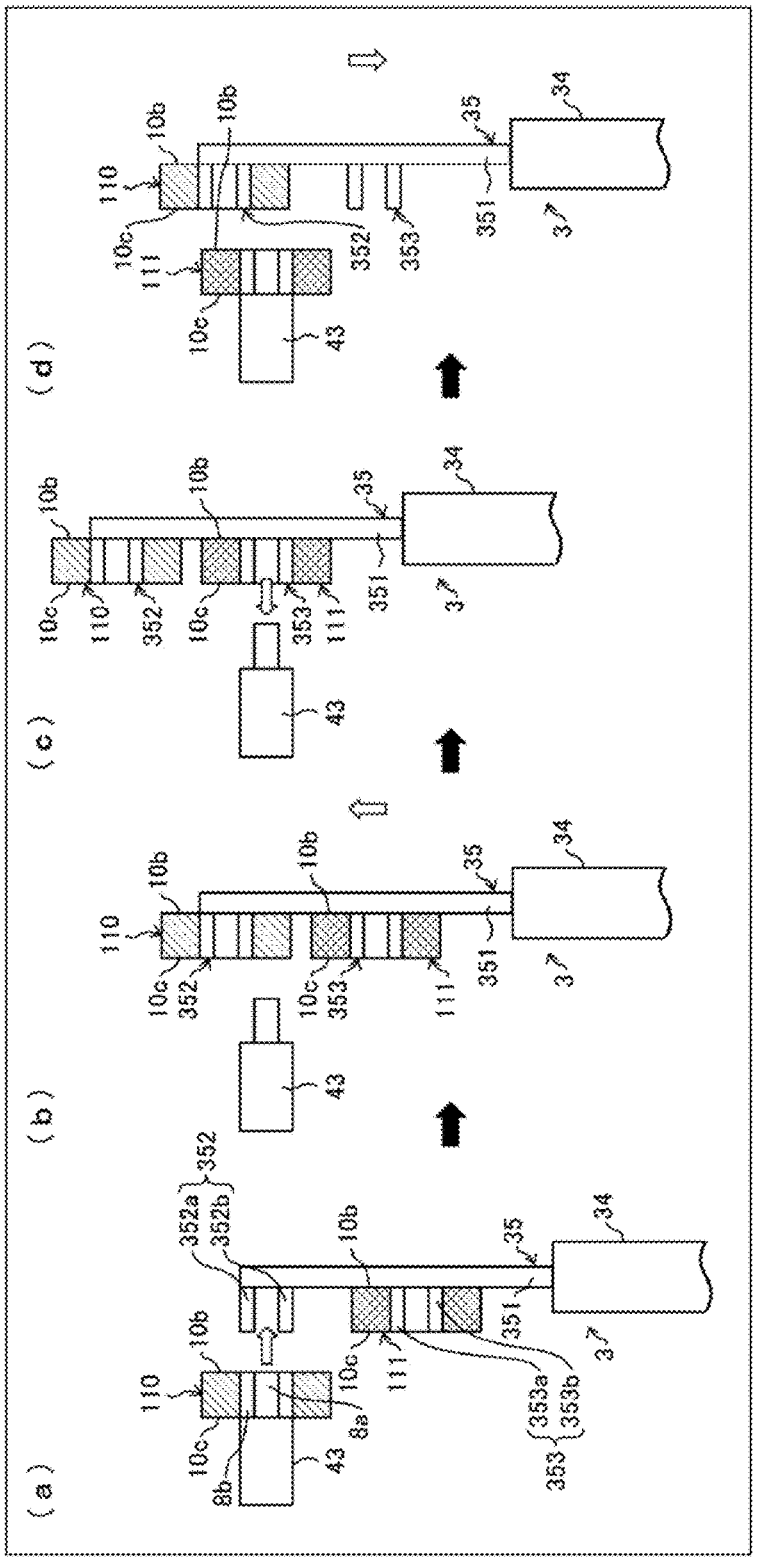

(a) through (d) of FIG. 6 each schematically illustrate a configuration of a variation of the robot arm 3 of each of (a) through (d) of FIG. 5 and an operating state of the variation. Specifically, (a) of FIG. 6 illustrates an operating state of the robot arm 3 in which operating state while holding a separator roll 11 which has not been inspected, the robot arm 3 withdraws, from the holding mechanism 43 of the defect inspection device 4, a separator roll 110 which has been inspected. (b) of FIG. 6 illustrates an operating state of the robot arm 3 in which operating state the robot arm 3 causes the hand part 35 to rotate. (c) of FIG. 6 illustrates an operating state of the robot arm 3 in which operating state the robot arm 3 sets, on the holding mechanism 43, the separator roll 111 which has not been inspected. (d) of FIG. 6 illustrates an operating state of the robot arm 3 which has set, on the holding mechanism 43, the separator roll 111 which has not been inspected.

As illustrated in (a) through (d) of FIG. 6, the robot arm 3 can include the hand part 35 which has the first gripping part 352 and the second gripping part 353 which are provided so as to face the holding mechanism 43 and be parallel to the longer side direction of the basal part 351. The configuration allows the robot arm 3 to hold two separator rolls 10 in series.

As illustrated in (a) of FIG. 6, the robot arm 3 which includes the hand part 35 described above withdraws the separator roll 110 from the holding mechanism 43 by causing the first gripping part 352 to hold, from the side of the first side surface 10b, the separator roll 10 which is held by the holding mechanism 43 from the side of the second side surface 10c.

Subsequently, as illustrated in (b) and (c) of FIG. 6, the robot arm 3 which has withdrawn the separator roll 110 (i) moves forward to a place at which the separator roll 111 which is held by the second gripping part 353 faces the holding mechanism 43 and (ii) sets the separator roll 111 on the holding mechanism 43.

Then, as illustrated in (d) of FIG. 6, the robot arm 3 which has set the separator roll 111 on the holding mechanism 43 moves backward to the outside of the defect inspection device 4.

The configuration in which the robot arm 3 thus holds a plurality of separator rolls 10 is exemplified by but not particularly limited to (i) a configuration in which the robot arm 3 holds a plurality of separator rolls 10 in parallel, (ii) a configuration in which the robot arm 3 holds a plurality of separator rolls 10 in series, and (iii) a combination of the configurations (i) and (ii).

(Variation 2)

Figure 7:
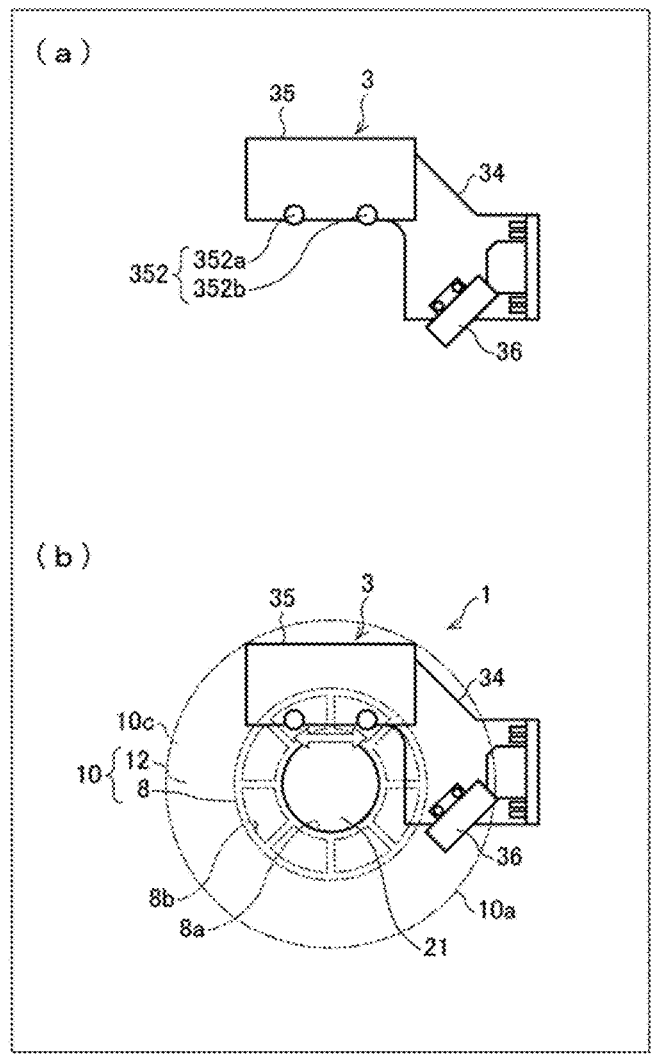

(a) and (b) of FIG. 7 each schematically illustrate a configuration of another variation of the robot arm 3 and an operating state of the another variation. Specifically, (a) of FIG. 7 is a side view schematically illustrating a configuration of a tip of the robot arm 3, and (b) of FIG. 7 is a side view illustrating an operating state in which the robot arm 3 illustrated in (a) of FIG. 7 grips a separator roll 10. In (b) of FIG. 7, the separator roll 10 which is located just in front of the robot arm 3 is shown by a broken line.

As illustrated in (a) and (b) of FIG. 7, it is possible to provide, near the tip of the robot arm 3, a roll sensor section 36 configured to detect whether a separator roll 10 which is held by the holding member 21 of the rack 2 and has not been inspected is present. In a case where the roll sensor section 36 detects the separator roll 10, the robot arm 3 takes out the separator roll 10 from the rack 2. Meanwhile, in a case where the roll sensor section 36 detects no separator roll 10, the robot arm 3 moves the tip to a place at which a subsequent separator roll 10 which is waiting to be inspected is supposed to be placed, and carries out sequential detection of presence or absence of a separator roll 10.

Specifically, the robot arm 3 reduces a speed of the hand part 35 just in front of the rack 2 and causes the roll sensor section 36 to detect the outer circumferential surface 10a of a separator roll 10. In a case where the roll sensor section 36 detects the outer circumferential surface 10a of a separator roll 10, the robot arm 3 inserts the pair of finger parts 352a and 352b of the first gripping part 352 in the respective second through holes 8b of the core 8 so as to make the interval between the pair of the finger parts 353a and 353b longer. This allows the robot arm 3 to hold the core 8 of the separator roll 10 so as to take out the separator roll 10 from the rack 2.

In a case where the robot arm 3 thus includes the roll sensor section, it is possible for the robot arm 3 to detect whether a separator roll 10 is present, and to transfer the separator roll 10 from the rack 2 to the defect inspection device 4. This makes it possible to reduce a tact time required for inspection of the separator 12 for a foreign object.

Note that the wound diameter (outer diameter) of a separator roll 10 can be measured by use of the roll sensor section. As described earlier, various pieces of information such as the wound diameter are displayed in advance on a label attached to the separator roll 10. Note, however, that the wound diameter of the separator roll 10 may change over time due to, for example, tight winding of the separator roll 10. Thus, it is possible for the roll sensor section to measure the wound diameter of the separator roll 10 and transmit a measured value to the defect inspection device 4. This allows the defect inspection device 4 to more suitably inspect, in accordance with, for example, the wound diameter measured, the separator roll 10 for a foreign object.

(Variation 3)

Figure 8:
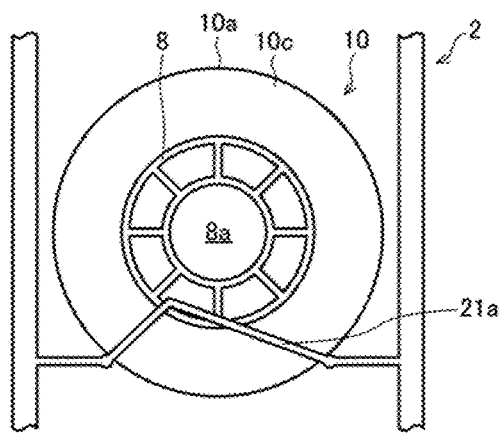

FIG. 8 is a side view showing a variation of a holding member 21 of the rack 2 illustrated in FIG. 3. As illustrated in FIG. 8, the rack 2 can include, instead of the holding member 21 configured to hold the first through hole 8a of the core 8, a holding member 21a configured to hold a separator roll 10, from the side of the second side surface 10c of the separator roll 10, at two points on the outer circumferential surface 10a. Since the holding member 21a holds the separator roll 10 at two points on the outer circumferential surface 10a of the separator roll 10, it is possible to hold the separator roll 10 without causing the separator roll 10 to rotate. Thus, the holding member 21a makes it possible to hold the separator roll 10 while preventing rotation of the separator roll 10. In this case, the holding member 21a is preferably configured to be in contact with no separator 12 but only the core 8 on the side of the second side surface 10c of the separator roll 10. Further, since the holding member 21a does not enter the first through hole 8a of the core 8 unlike the holding member 21 illustrated in FIG. 3, it is possible to achieve, in the rack 2, a smaller space to be required for transfer of the separator roll 10 between the robot arm 3 and the rack 2.

Embodiment 2

Another embodiment of the present invention is described below with reference to FIG. 9. Note that, for convenience, members having functions identical to those of the respective members described in Embodiment 1 are given respective identical reference signs, and a description of those members is omitted here.

(Configuration of Transfer System)

Figure 9:
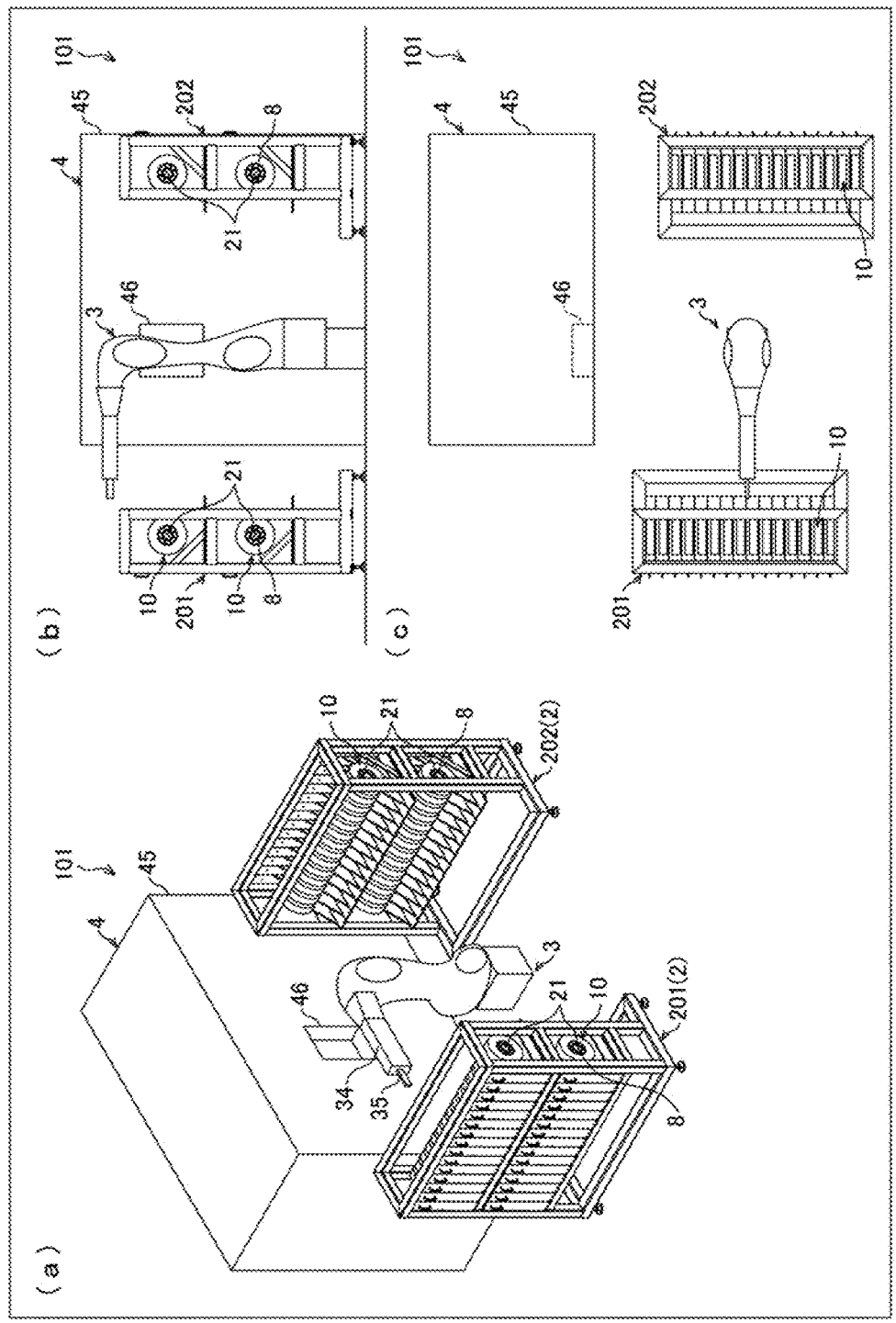

(a) through (c) of FIG. 9 each schematically illustrate a configuration of a transfer system 101 in accordance with Embodiment 2. Specifically, (a) of FIG. 9 is a perspective view of the transfer system 101, (b) of FIG. 9 is a side view of the transfer system 101, and (c) of FIG. 9 is a top view of the transfer system 101.

As illustrated in (a) through (c) of FIG. 9, the transfer system 101 differs from the transfer system 1 (described earlier) mainly in that the transfer system 101 includes, instead of the rack 2, a pre-inspection rack 201 and a post-inspection rack 202.

(Pre-Inspection Rack)

The pre-inspection rack 201 is a placement member on which to place a separator roll 10 (110) which has not been inspected. A specific configuration of the pre-inspection rack 201 is substantially identical to the configuration of the rack 2 described earlier.

The pre-inspection rack 201 holds a separator roll 10 by inserting a holding member 21 in a first through hole 8a of a core 8 of the separator roll 10 from a side of a second side surface 10c of the separator roll 10. With the configuration, the pre-inspection rack 201 holds each separator roll 10, without coming into direct contact with a separator 12, while causing an outer circumferential surface 10a of the separator roll 10 to face a robot arm 3.

The robot arm 3 holds, from a side of a first side surface 10b of a separator roll 10 which is placed on the pre-inspection rack 201 the core 8 of the separator roll 10, and takes out the separator roll 10 from the pre-inspection rack 201. Then, the separator roll 10 which has been taken out from the pre-inspection rack 201 is carried into a defect inspection device 4 so as to be inspected for a defect.

(Post-Inspection Rack)

The post-inspection rack 202 is a placement member on which to place the separator roll 10 (110) which has been inspected. A specific configuration of the post-inspection rack 202 is substantially identical to the configuration of each of the rack 2 (described earlier) and the pre-inspection rack 201 (described earlier).

The post-inspection rack 202 receives, from the robot arm 3, the separator roll 10 which has been inspected. Specifically, the post-inspection rack 202 inserts a holding member 21 in the first through hole 8a of the core 8 of the inspected separator roll 10 from the side of the second side surface 10c of the separator roll 10 so as to receive the separator roll 10. With the configuration, the post-inspection rack 202 holds each separator roll 10, without coming into direct contact with the separator 12, while causing the outer circumferential surface 10a of the separator roll 10 to face the robot arm 3.

(Recap of Transfer System)

As described earlier, the transfer system 101 is configured such that the robot arm 3 holds the core 8 from the side of the first side surface 10b of the separator roll 10, and the holding member 21 of each of the pre-inspection rack 201 and the post-inspection rack 202 holds the core 8 from the side of the second side surface 10c of the separator roll 10. Thus, since the robot arm 3 holds the separator roll 10 from a side of a first side surface of the separator roll 10 and each of the pre-inspection rack 201 and the post-inspection rack 202 holds the separator roll 10 from a side of a second side surface, different from the first side surface, of the separator roll 10, the separator roll 10 can be efficiently transferred between (a) the robot arm 3 and (b) each of the pre-inspection rack 201 and the post-inspection rack 202.

Further, since each of (i) the robot arm 3 and (ii) the holding member 21 of each of the pre-inspection rack 201 and the post-inspection rack 202 holds the core 8 of the separator roll 10, the separator roll 10 can be transferred without a direct contact of each of the robot arm 3, the pre-inspection rack 201, and the post-inspection rack 202 with the separator 12 wound around the core 8.

In addition, the robot arm 3 holds the separator roll 10 by inserting a first gripping part 352 and a second gripping part 353 in respective second through holes 8b of the core 8, and each of the pre-inspection rack 201 and the post-inspection rack 202 holds the separator roll 10 by inserting the holding member 21 in the first through hole 8a of the core 8. As described above, since the robot arm 3 holds a first part of the core 8 and each of the pre-inspection rack 201 and the post-inspection rack 202 holds a second part, different from the first part, of the core 8, the separator roll 10 can be more efficiently transferred between (a) the robot arm 3 and (b) each of the pre-inspection rack 201 and the post-inspection rack 202.

Note that the placement member on which to place the separator roll 10 can be, for example, a belt conveyor instead of the pre-inspection rack 201 and the post-inspection rack 202. Alternatively, the placement member can be a combination of a rack and a belt conveyor. For example, the post-inspection rack 202 of the pre-inspection rack 201 and the post-inspection rack 202 can be replaced with a belt conveyor. With the configuration, the separator roll 10 which has been inspected can be carried immediately so as to be subjected to a subsequent step. This makes it possible to reduce a tact time required for production of the separator 12.

Embodiment 3

A further embodiment of the present invention is described below with reference to FIGS. 10 through 12. Note that, for convenience, members having functions identical to those of the respective members described in Embodiments 1 and 2 are given respective identical reference signs, and a description of those members is omitted here.

(Configuration of Transfer System)

Figure 10:
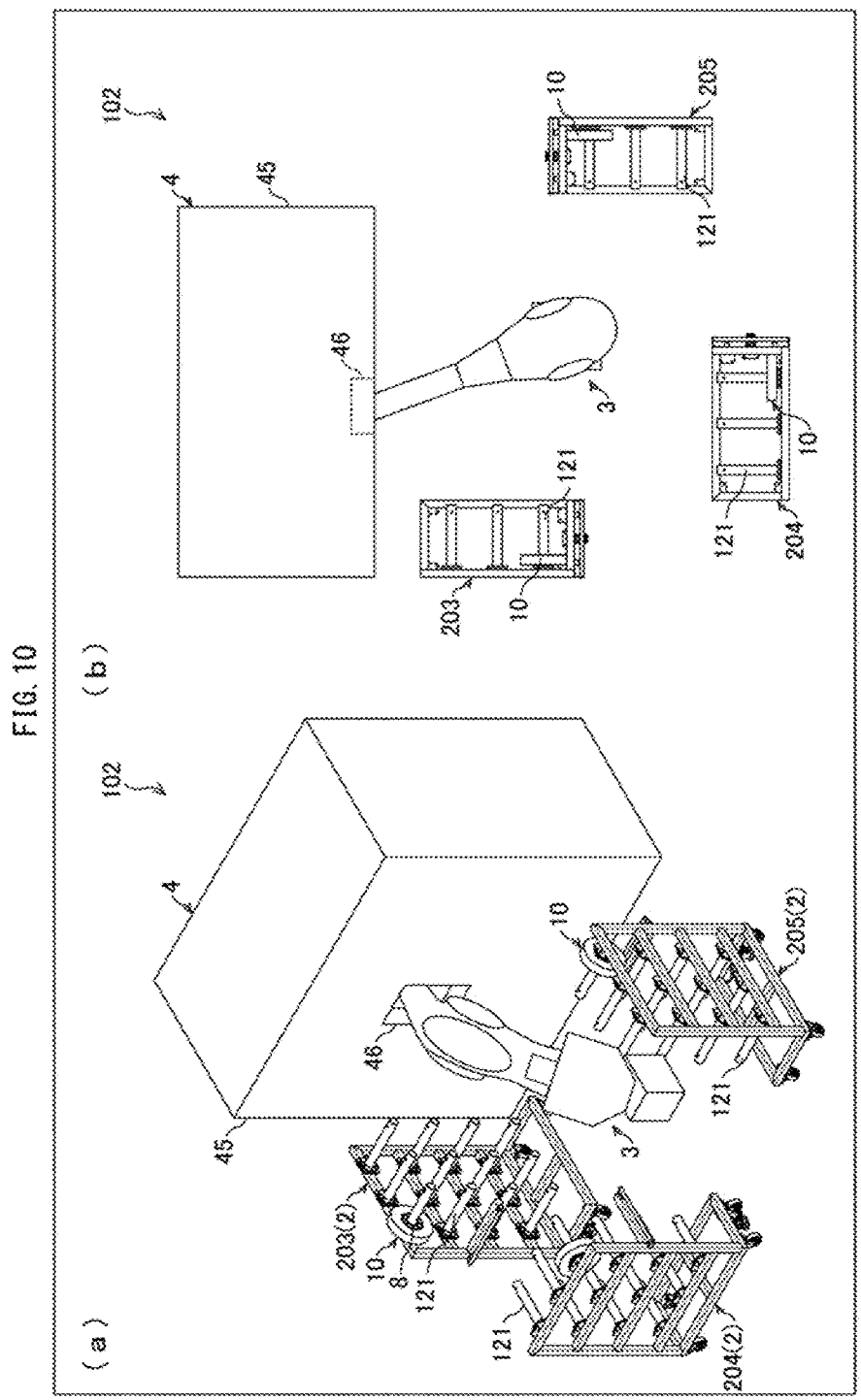

(a) and (b) of FIG. 10 each schematically illustrate a configuration of a transfer system 102 in accordance with Embodiment 3. Specifically, (a) of FIG. 10 is a perspective view of the transfer system 102, and (b) of FIG. 10 is a top view of the transfer system 102.

As illustrated in (a) and (b) of FIG. 10, the transfer system 102 differs from the transfer system 1 (described earlier) mainly in that the transfer system 102 includes, instead of the rack 2, a pre-inspection rack 203, a non-defective product rack 204, and a defective product rack 205.

(Pre-Inspection Rack)

The pre-inspection rack 203 is a placement member on which to place a separator roll 10 (111) which has not been inspected. The pre-inspection rack 203 includes a plurality of holding members 121 configured to hold separator rolls 10. These holding members 121 are provided so as to extend toward a robot arm 3. The pre-inspection rack 203 holds a separator roll 10 by inserting a holding member 121 in a first through hole 8a of a core 8 of the separator roll 10 from a side of a second side surface 10c of the separator roll 10. With the configuration, the pre-inspection rack 203 holds each separator roll 10, without coming into direct contact with a separator 12, while causing a first side surface 10b of the separator roll 10 to face the robot arm 3.

The pre-inspection rack 203, which is configured such that a single holding member 121 can hold a plurality of separator rolls 10, allows more separator rolls 10 to be placed thereon.

The robot arm 3 holds, from a side of the first side surface 10b of a separator roll 10 which is placed on the pre-inspection rack 203, the core 8 of the separator roll 10, and takes out the separator roll 10 from the pre-inspection rack 203. Then, the separator roll 10 which has been taken out from the pre-inspection rack 203 is carried into a defect inspection device 4 so as to be inspected for a defect.

(Non-Defective Product Rack)

The non-defective product rack 204 is a placement member on which to place a separator roll 10 (110) which has been inspected and in which no defect has been found. A specific configuration of the non-defective product rack 204 is substantially identical to the configuration of the pre-inspection rack 203.

The non-defective product rack 204 receives, from the robot arm 3, the separator roll 10 which has been inspected and in which no defect has been found. Specifically, the non-defective product rack 204 inserts, from the side of the second side surface 10c of the separator roll 10 which has been inspected and in which no defect has been found, a holding member 121 in the first through hole 8a of the core 8 of the separator roll 10 so as to receive the separator roll 10. With the configuration, the non-defective product rack 204 holds each separator roll 10 while causing the first side surface 10b of the separator roll 10 to face the robot arm 3.

(Defective Product Rack)

The defective product rack 205 is a placement member on which to place the separator roll 10 (110) which has been inspected and in which a defect has been found. A specific configuration of the defective product rack 205 is substantially identical to the configuration of each of the pre-inspection rack 203 and the non-defective product rack 204.

The defective product rack 205 receives, from the robot arm 3, the separator roll 10 which has been inspected and in which a defect has been found. Specifically, the defective product rack 205 inserts, from the side of the second side surface 10c of the separator roll 10 which has been inspected and in which a defect has been found, a holding member 121 in the first through hole 8a of the core 8 of the separator roll 10 so as to receive the separator roll 10. With the configuration, the defective product rack 205 holds each separator roll 10 while causing the first side surface 10b of the separator roll 10 to face the robot arm 3.

(Recap of Transfer System)

As described earlier, Embodiment 3 is configured such that the robot arm 3 holds the core 8 from the side of the first side surface 10b of the separator roll 10, and the holding member 121 of each of the pre-inspection rack 203, the non-defective product rack 204, and the defective product rack 205 holds the core 8 from the side of the second side surface 10c of the separator roll 10. Thus, since the robot arm 3 holds the separator roll 10 from a side of a first side surface of the separator roll 10 and each of the pre-inspection rack 203, the non-defective product rack 204, and the defective product rack 205 holds the separator roll 10 from a side of a second side surface, different from the first side surface, of the separator roll 10, the separator roll 10 can be efficiently transferred between (a) the robot arm 3 and (b) each of the pre-inspection rack 203, the non-defective product rack 204, and the defective product rack 205.

Further, since each of (i) the robot arm 3 and (ii) the holding member 121 of each of the pre-inspection rack 203, the non-defective product rack 204, and the defective product rack 205 holds the core 8 of the separator roll 10, the separator roll 10 can be transferred without a direct contact of each of the robot arm 3, the pre-inspection rack 203, the non-defective product rack 204, and the defective product rack 205 with the separator 12 wound around the core 8.

In addition, the robot arm 3 holds the separator roll 10 by inserting a first gripping part 352 and a second gripping part 353 in respective second through holes 8b of the core 8, and each of the pre-inspection rack 203, the non-defective product rack 204, and the defective product rack 205 holds the separator roll 10 by inserting the holding member 121 in the first through hole 8a of the core 8. As described above, since the robot arm 3 holds a first part of the core 8 and each of the pre-inspection rack 203, the non-defective product rack 204, and the defective product rack 205 holds a second part, different from the first part, of the core 8, the separator roll 10 can be more efficiently transferred between (a) the robot arm 3 and (b) each of the pre-inspection rack 203, the non-defective product rack 204, and the defective product rack 205.

Note that the placement member on which to place the separator roll 10 can be, for example, a belt conveyor instead of the pre-inspection rack 203, the non-defective product rack 204, and the defective product rack 205. Alternatively, the placement member can be a combination of a rack and a belt conveyor. For example, the non-defective product rack 204 of the pre-inspection rack 203, the non-defective product rack 204, and the defective product rack 205 can be replaced with a belt conveyor. With the configuration, the separator roll 10 in which no defect has been found can be carried immediately so as to be subjected to a packing step. This makes it possible to reduce a tact time required for production of the separator 12.

(Variation 1)

Each of the pre-inspection rack 203, the non-defective product rack 204, and the defective product rack 205 can include an anti-rotation member configured to prevent rotation of the separator roll 10 held by the holding member 121. The following description takes the pre-inspection rack 203 as an example. Note, however, the description also applies to each of the non-defective product rack 204 and the defective product rack 205.

Figure 11:
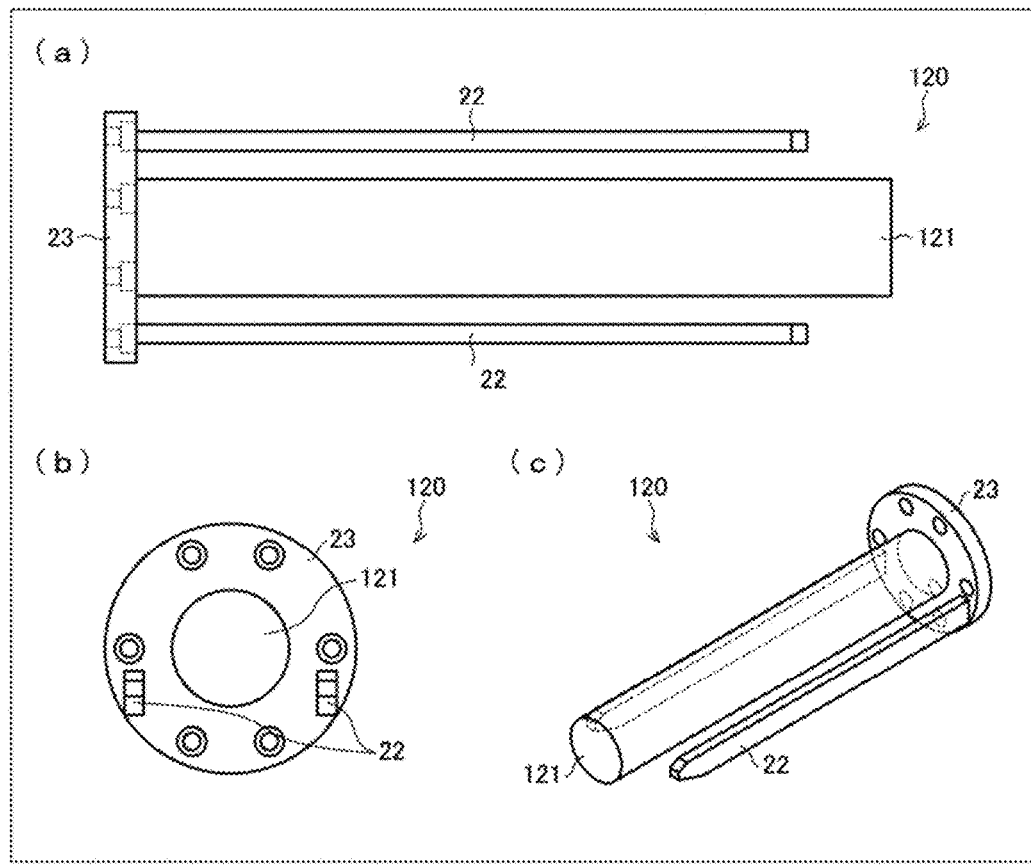

(a) through (c) of FIG. 11 each schematically illustrate a holding mechanism 120 of the pre-inspection rack 203. Specifically, (a) of FIG. 11 is a top view of the holding mechanism 120, (b) of FIG. 11 is a front view of the holding mechanism 120, and (c) of FIG. 11 is a perspective view of the holding mechanism 120.

As illustrated in (a) through (c) of FIG. 11, the holding mechanism 120 includes the holding member 121 which is inserted in the first through hole 8a of the core 8 of the separator roll 10, two angle members 22 which are inserted in respective second through holes 8b of the core 8, and a disk base 23 which is substantially disk-shaped. Each of the holding member 121 and the two angle members 22 is provided so as to stick into the disk base 23.

The holding member 121 is provided so as to stick into a substantially central part of the disk base 23, and is inserted in the first through hole 8a of the core 8 from the side of the second side surface 10c of the separator roll 10 so as to hold the separator roll 10.

Each of the angle members 22 is an anti-rotation member configured to prevent rotation of the separator roll 10 held by the holding member 121. The angle members 22 are provided so as to (i) stick into the disk base 23 and (ii) be substantially parallel to the holding member 121. The angle members 22 are inserted in the respective second through holes 8b of the core 8 from the side of the second side surface 10c of the separator roll 10. The configuration makes it possible to prevent rotation of the separator roll 10 held by the holding member 121, and consequently to keep an orientation (angle) of the separator roll 10 constant. Note that the shape and the number of angle members 22 can be appropriately changed provided that an angle member 22 is capable of preventing rotation of the separator roll 10 held by the holding member 121.

(Variation 2)

The transfer system 102 can include a lifter configured to fix each of the pre-inspection rack 203, the non-defective product rack 204, and the defective product rack 205 in a predetermined position. The following description takes the pre-inspection rack 203 as an example. Note, however, the description also applies to each of the non-defective product rack 204 and the defective product rack 205.

Figure 12:
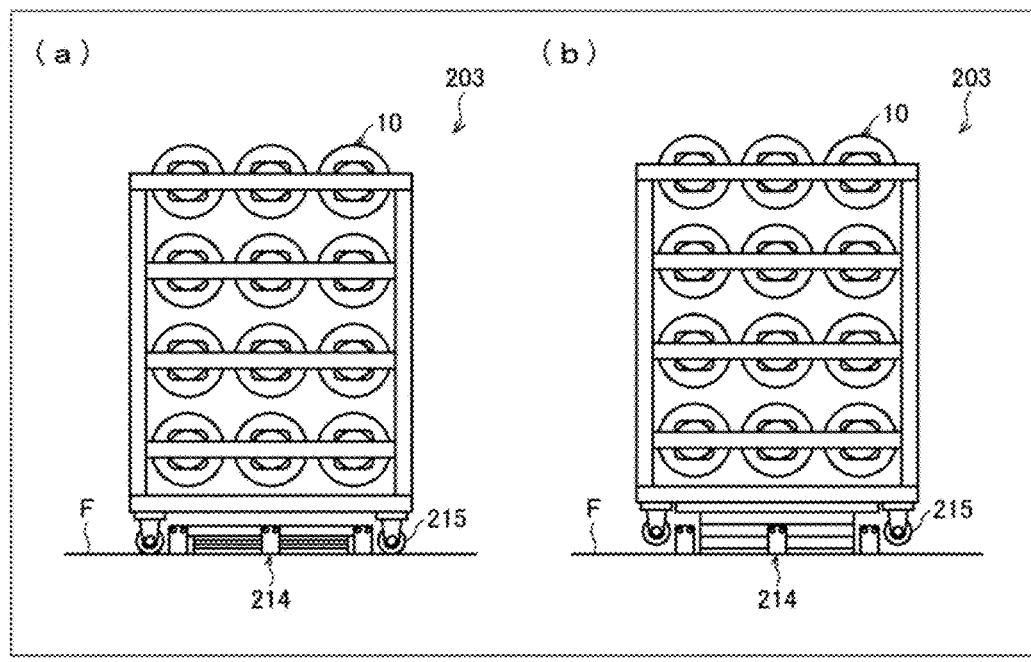

(a) and (b) of FIG. 12 are front views each illustrating an operating state of a lifter 214 configured to fix the pre-inspection rack 203 illustrated in FIG. 10. Specifically, (a) of FIG. 12 illustrates a state in which the lifter 214 is in its lowered position, and (b) of FIG. 12 illustrates a state in which the lifter 214 is in its raised position.

As illustrated in (a) and (b) of FIG. 12, the lifter 214 is set in a predetermined position in a floor F. The pre-inspection rack 203 is provided with wheels 215 so as to be easily moved. In a case where the pre-inspection rack 203 is carried to a place above the lifter 214, which place is a predetermined position, the lifter 214, which is set below the pre-inspection rack 203, is operated from its lowered position to its raised position. This allows the pre-inspection rack 203 to be fixed while the wheels 215 of the pre-inspection rack 203 are being lifted from the floor F by approximately 20 mm.

By thus using the lifter 214, it is possible to position and fix the pre-inspection rack 203 easily in the transfer system 102. Further, by causing the lifter 214 to fix the pre-inspection rack 203 while the pre-inspection rack 203 is being lifted, it is possible to (i) reduce influence, on the pre-inspection rack 203, of, for example, a state of the floor F and an individual difference in accuracy of manufacture of racks and (ii) prevent the pre-inspection rack 203 from being positionally displaced in a horizontal direction and a vertical direction.

Embodiment 4

A further embodiment of the present invention is described below with reference to FIGS. 13 and 14. Note that, for convenience, members having functions identical to those of the respective members described in Embodiments 1 through 3 are given respective identical reference signs, and a description of those members is omitted here.

(Configuration of Transfer System)

Figure 13:
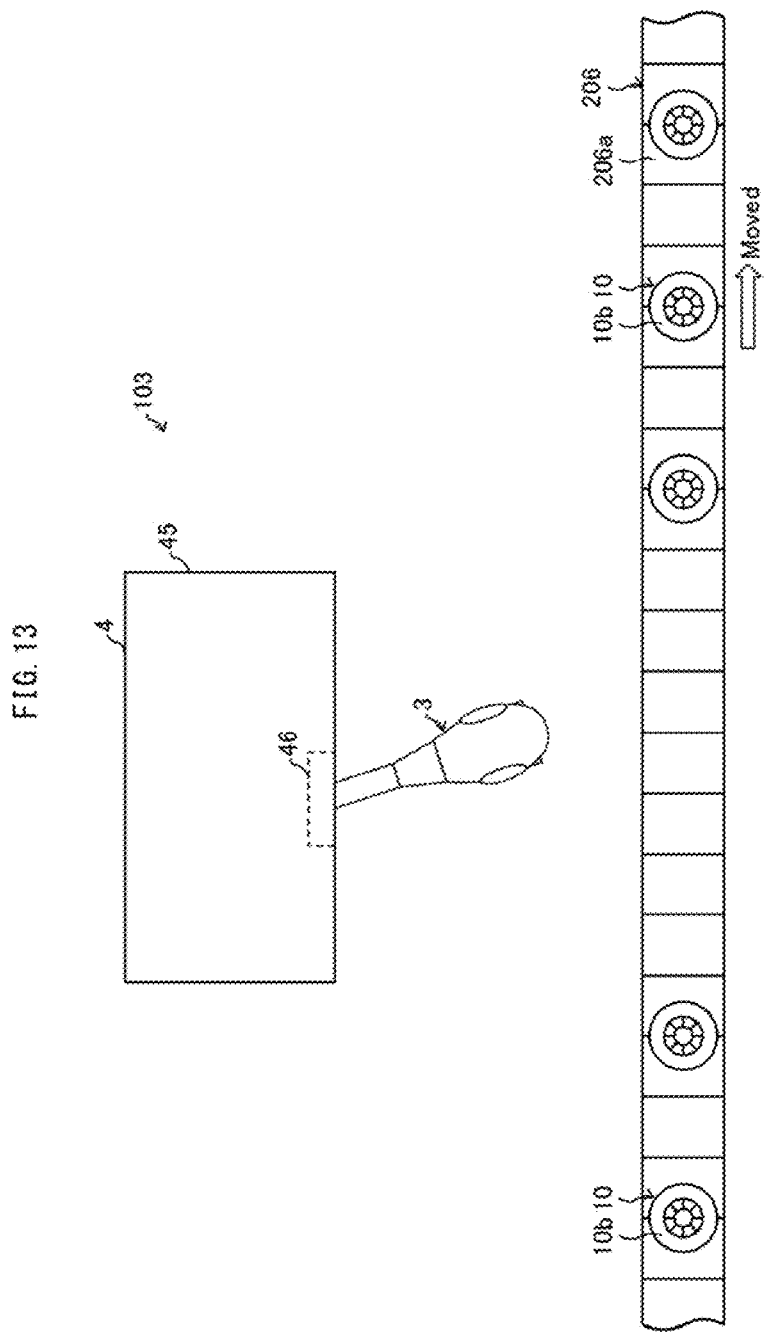
Figure 14:
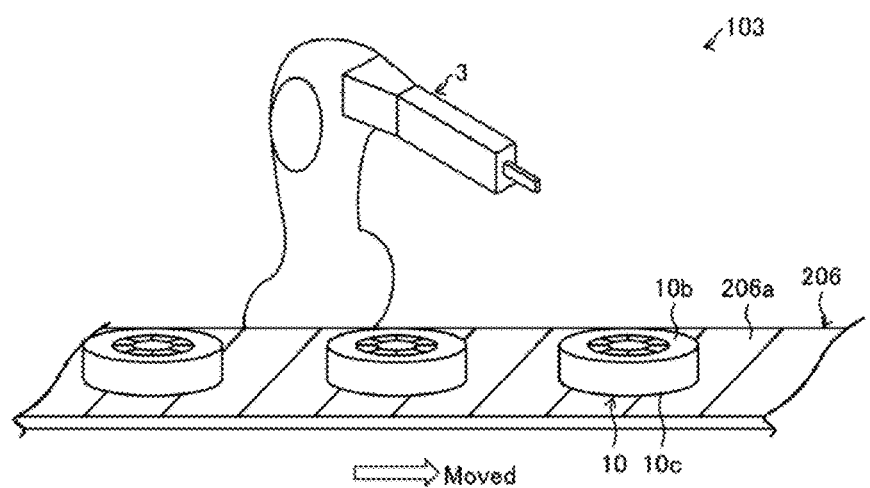

FIG. 13 is a top view schematically illustrating a configuration of a transfer system 103 in accordance with Embodiment 4. FIG. 14 schematically illustrates the transfer system of FIG. 13 from a different angle. As illustrated in FIGS. 13 and 14, the transfer system 103 differs from the transfer system 1 (described earlier) mainly in that the transfer system 103 includes, as a placement member on which to place a separator roll 10, a belt conveyor 206 instead of the rack 2.

(Belt Conveyor)

The belt conveyor 206 is a placement member on which to place a plurality of separator rolls 10. On the belt conveyor 206, a separator roll 10 (111) which has not been inspected and a separator roll 10 (110) which has been inspected are placed. Embodiment 4 uses the belt conveyor as the placement member. Note, however, that examples of a conveyor that can be replaced with the belt conveyor include various conveyors such as a chain conveyor, a roller conveyor, and a screw conveyor.

The belt conveyor 206 has a holding surface (placement surface) 206a on which to hold (place) a separator roll 10. The belt conveyor 206 conveys the separator roll 10 while causing the holding surface 206a to hold a side of a second side surface 10c of the separator roll 10. Embodiment 4 is preferably configured such that a separator 12 is wound around an outer circumferential surface 81a of a core 8 of the separator roll 10 so that a side surface of the core 8 is closer to the holding surface 206a than a side surface of the separator 12 on the side of the second side surface 10c of the separator roll 10. With the configuration, the belt conveyor 206 can convey the separator roll 10, without coming into direct contact with the separator 12, while causing the holding surface 206a to hold the core 8 of the separator roll 10.

The transfer system 103 is configured to intermittently drive the belt conveyor 206 so as to cause a separator roll 10 to travel a predetermined distance. A robot arm 3 holds, from a side of a first side surface 10b of a separator roll 10 which has been conveyed by the belt conveyor 206 and has not been inspected, the core 8 of the separator roll 10, and carries the separator roll 10 into a defect inspection device 4. The robot arm 3 holds the core 8 from the side of the first side surface 10b of the separator roll 10 which has been inspected, and places the separator roll 10 on the belt conveyor 206 while causing the second side surface 10c of the separator roll 10 to face the holding surface 206a. The transfer system 103 is thus configured to repeatedly carry out an operation to inspect the separator roll 10 for a foreign object by driving the belt conveyor 206 so as to cause the separator roll 10 to travel a predetermined distance.

Note that the holding surface 206a of the belt conveyor 206 can be provided with a protrusion by which to support the separator roll 10 at a distance from the holding surface 206a. The configuration makes it possible to more reliably prevent the separator 12 from coming into contact with the holding surface 206a. The configuration also makes it possible to prevent the separator roll 10 on the belt conveyor 206 (holding surface 206a) from being positionally displaced due to vibrations generated in association with operation of the belt conveyor 206.

(Recap of Transfer System)

As described earlier, the transfer system 103 in accordance with Embodiment 4 is configured such that the robot arm 3 holds the core 8 of the separator roll 10 from the side of the first side surface 10b of the separator roll 10, and the belt conveyor 206 holds the core 8 of the separator roll 10 from the side of the second side surface 10c of the separator roll 10.

Since the robot arm 3 and the belt conveyor 206 thus hold the core 8 of the separator roll 10 from the sides of the respective different side surfaces of the separator roll 10, the separator roll 10 can be efficiently transferred between the robot arm 3 and the belt conveyor 206 without a direct contact of each of the robot arm 3 and the belt conveyor 206 with the separator 12 wound around the core 8.

Further, by using the belt conveyor 206 as the placement member, it is possible to automatically convey a separator roll 10 which has not been inspected and a separator roll 10 which has been inspected, and consequently to reduce a tact time required for production of the separator 12.

Embodiment 5

A further embodiment of the present invention is described below with reference to FIG. 15. Note that, for convenience, members having functions identical to those of the respective members described in Embodiments 1 through 4 are given respective identical reference signs, and a description of those members is omitted here.

(Configuration of Transfer System)

Figure 15:
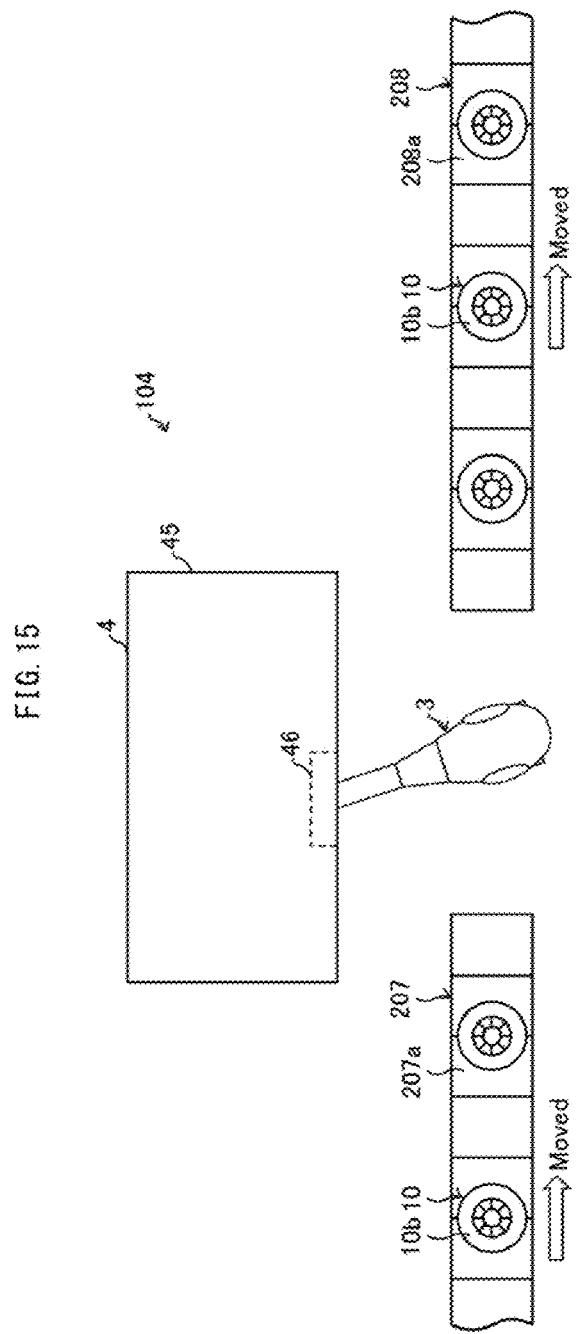
FIG. 15 is a top view schematically illustrating a configuration of a transfer system in accordance with Embodiment 5.

FIG. 15 is a top view schematically illustrating a configuration of a transfer system 104 in accordance with Embodiment 5. As illustrated in FIG. 15, the transfer system 104 differs from the transfer system 1 (described earlier) mainly in that the transfer system 104 includes, as a placement member on which to place a separator roll 10, a pre-inspection belt conveyor 207 and a post-inspection belt conveyor 208 instead of the rack 2.

(Pre-Inspection Belt Conveyor)

The pre-inspection belt conveyor 207 is a placement member on which to place a separator roll 10 (111) which has not been inspected. A specific configuration of the pre-inspection belt conveyor 207 is substantially identical to the configuration of the belt conveyor 206 described earlier.

The pre-inspection belt conveyor 207 conveys the separator roll 10 while causing a holding surface 207a thereof to hold a core 8 of the separator roll 10 from a side of a second side surface 10c of the separator roll 10. A robot arm 3 holds the core 8 from a side of a first side surface 10b of the separator roll 10 which has not been inspected and is conveyed by the pre-inspection belt conveyor 207, and carries the separator roll 10 into a defect inspection device 4.

(Post-Inspection Belt Conveyor)

The post-inspection belt conveyor 208 is a placement member on which to place a separator roll 10 (110) which has been inspected. A specific configuration of the post-inspection belt conveyor 208 is substantially identical to the configuration of the belt conveyor 206 described earlier.

The post-inspection belt conveyor 208 conveys the separator roll 10 while causing a holding surface 208a thereof to hold the core 8 of the separator roll 10 from the side of the second side surface 10c of the separator roll 10. The robot arm 3 holds the core 8 from the side of the first side surface 10b of the separator roll 10 which has been inspected, and places the separator roll 10 on the post-inspection belt conveyor 208 while causing the second side surface 10c of the separator roll 10 to face the holding surface 208a.

(Recap of Transfer System)

As described earlier, the transfer system 104 in accordance with Embodiment 5 is configured such that the robot arm 3 holds the core 8 from the side of the first side surface 10b of the separator roll 10, and each of the pre-inspection belt conveyor 207 and the post-inspection belt conveyor 208 holds the core 8 from the side of the second side surface 10c of the separator roll 10.

As described above, since the robot arm 3 holds the core 8 of the separator roll 10 from a side of a first side surface of the separator roll 10 and each of the pre-inspection belt conveyor 207 and the post-inspection belt conveyor 208 holds the core 8 of the separator roll 10 from a side of a second side surface, different from the first side surface, of the separator roll 10, the separator roll 10 can be efficiently transferred between (a) the robot arm 3 and (b) each of the pre-inspection belt conveyor 207 and the post-inspection belt conveyor 208 without a direct contact of each of the robot arm 3, the pre-inspection belt conveyor 207, and the post-inspection belt conveyor 208 with a separator 12 wound around the core 8.

Further, by using each of the pre-inspection belt conveyor 207 and the post-inspection belt conveyor 208 as the placement member, the separator roll 10 (e.g., the separator roll 10 which has been inspected) can be carried immediately so as to be subjected to a subsequent step. This makes it possible to reduce a tact time required for production of the separator 12. Alternatively, as the placement member, a rack and a belt conveyor can be used in combination.

Embodiment 6

A further embodiment of the present invention is described below with reference to FIG. 16. Note that, for convenience, members having functions identical to those of the respective members described in Embodiments 1 through 5 are given respective identical reference signs, and a description of those members is omitted here.

(Configuration of Transfer System)

Figure 16:
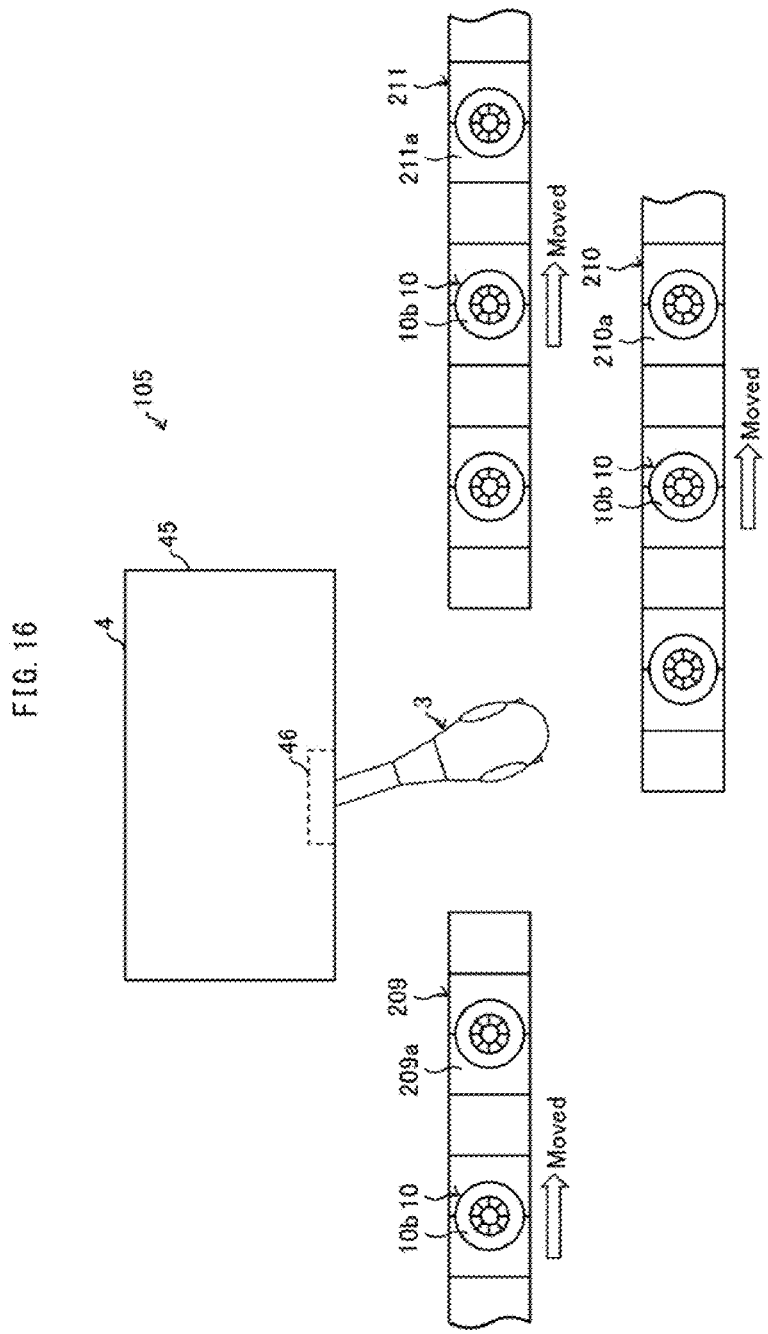
FIG. 16 is a top view schematically illustrating a configuration of a transfer system in accordance with Embodiment 6.

FIG. 16 is a top view schematically illustrating a configuration of a transfer system 105 in accordance with Embodiment 6. As illustrated in FIG. 16, the transfer system 105 differs from the transfer system 1 (described earlier) mainly in that the transfer system 105 includes, as a placement member on which to place a separator roll 10, a pre-inspection belt conveyor 209, a non-defective product belt conveyor 210, and a defective product belt conveyor 211 instead of the rack 2.

(Pre-Inspection Belt Conveyor)

The pre-inspection belt conveyor 209 is a placement member on which to place a separator roll 10 (111) which has not been inspected. A specific configuration of the pre-inspection belt conveyor 209 is substantially identical to the configuration of the belt conveyor 206 described earlier.

The pre-inspection belt conveyor 209 conveys the separator roll 10 while causing a holding surface 209a thereof to hold a core 8 of the separator roll 10 from a side of a second side surface 10c of the separator roll 10. A robot arm 3 holds the core 8 from a side of a first side surface 10b of the separator roll 10 which has not been inspected and is conveyed by the pre-inspection belt conveyor 209, and carries the separator roll 10 into a defect inspection device 4.

(Non-Defective Product Belt Conveyor)

The non-defective product belt conveyor 210 is a placement member on which to place a separator roll 10 (110) which has been inspected and in which no defect has been found. A specific configuration of the non-defective product belt conveyor 210 is substantially identical to the configuration of the belt conveyor 206 described earlier.

The non-defective product belt conveyor 210 conveys the separator roll 10 while causing a holding surface 210a thereof to hold the core 8 of the separator roll 10 from the side of the second side surface 10c of the separator roll 10. The robot arm 3 holds the core 8 from the side of the first side surface 10b of the separator roll 10 which has been inspected and in which no defect has been found, and places the separator roll 10 on the non-defective product belt conveyor 210 while causing the second side surface 10c of the separator roll 10 to face the holding surface 210a.

(Defective Product Belt Conveyor)

The defective product belt conveyor 211 is a placement member on which to place the separator roll 10 (110) which has been inspected and in which a defect has been found. A specific configuration of the defective product belt conveyor 211 is substantially identical to the configuration of the belt conveyor 206 described earlier.

The defective product belt conveyor 211 conveys the separator roll 10 while causing a holding surface 211a thereof to hold the core 8 of the separator roll 10 from the side of the second side surface 10c of the separator roll 10. The robot arm 3 holds the core 8 from the side of the first side surface 10b of the separator roll 10 which has been inspected and in which a defect has been found, and places the separator roll 10 on the defective product belt conveyor 211 while causing the second side surface 10c of the separator roll 10 to face the holding surface 211a.

As described above, since the robot arm 3 holds the core 8 of the separator roll 10 from a side of a first side surface of the separator roll 10 and each of the pre-inspection belt conveyor 209, the non-defective product belt conveyor 210, and the defective product belt conveyor 211 holds the core 8 of the separator roll 10 from a side of a second side surface, different from the first side surface, of the separator roll 10, the separator roll 10 can be efficiently transferred between (a) the robot arm 3 and (b) each of the pre-inspection belt conveyor 209, the non-defective product belt conveyor 210, and the defective product belt conveyor 211.

(Recap of Transfer System)

As described earlier, the transfer system 105 in accordance with Embodiment 6 is configured such that the robot arm 3 holds the core 8 from the side of the first side surface 10b of the separator roll 10, and each of the pre-inspection belt conveyor 209, the non-defective product belt conveyor 210, and the defective product belt conveyor 211 holds the core 8 from the side of the second side surface 10c of the separator roll 10.

As described above, since the robot arm 3 holds the core 8 of the separator roll 10 from the side of the first side surface of the separator roll 10 and each of the pre-inspection belt conveyor 209, the non-defective product belt conveyor 210, and the defective product belt conveyor 211 holds the core 8 of the separator roll 10 from the side of the second side surface, different from the first side surface, of the separator roll 10, the separator roll 10 can be efficiently transferred between (a) the robot arm 3 and (b) each of the pre-inspection belt conveyor 209, the non-defective product belt conveyor 210, and the defective product belt conveyor 211 without a direct contact of each of the robot arm 3, the pre-inspection belt conveyor 209, the non-defective product belt conveyor 210, and the defective product belt conveyor 211 with a separator 12 wound around the core 8.

Further, by using each of the pre-inspection belt conveyor 209, the non-defective product belt conveyor 210, and the defective product belt conveyor 211 as the placement member, the separator roll 10 (e.g., the separator roll 10 in which no defect has been found) can be carried immediately so as to be subjected to a packing step. This makes it possible to reduce a tact time required for production of the separator 12. Alternatively, as the placement member, a rack and a belt conveyor can be used in combination.

Embodiment 7

A further embodiment of the present invention is described below with reference to FIG. 17. Note that, for convenience, members having functions identical to those of the respective members described in Embodiments 1 through 6 are given respective identical reference signs, and a description of those members is omitted here.

(Configuration of Transfer System)

Figure 17:
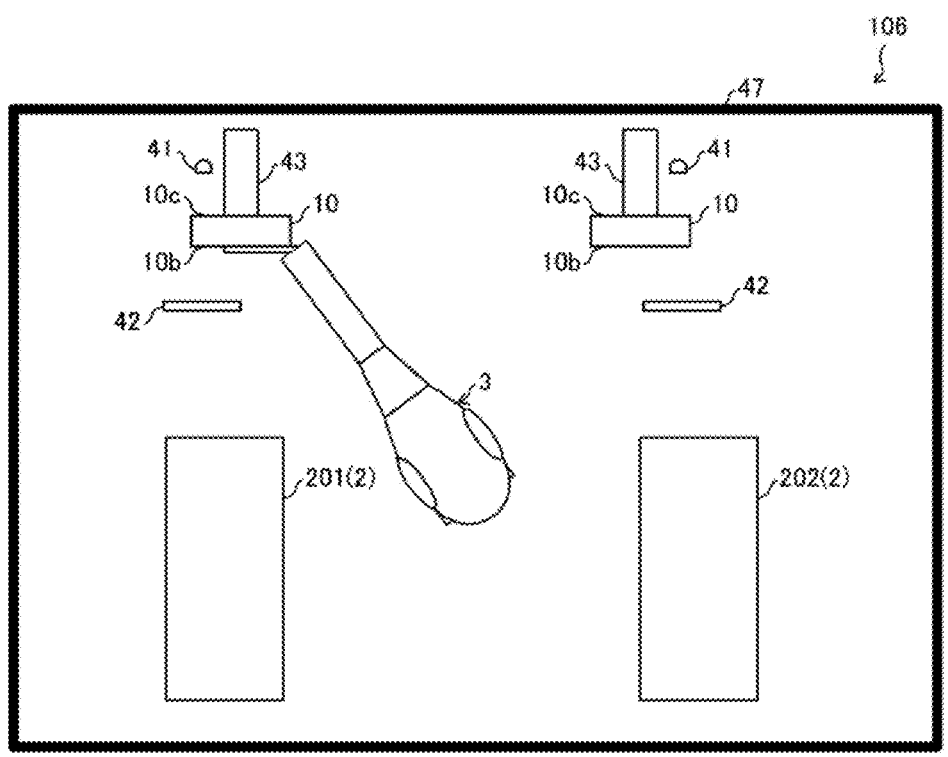
FIG. 17 is a top view schematically illustrating a configuration of a transfer system in accordance with Embodiment 7.

FIG. 17 is a top view schematically illustrating a configuration of a transfer system 106 in accordance with Embodiment 7. As illustrated in FIG. 17, the transfer system 106 differs from the transfer system 1 (described earlier) mainly in that the transfer system 106 includes a housing 47 in which various devices are provided.

(Housing)

In order that an electromagnetic wave used does not leak outside, the housing 47 is made up of wall surfaces that contain, for example, lead and prevent the electromagnetic wave from easily passing therethrough. The housing 47 is provided with a door (not illustrated in FIG. 17), which is openable for a separator roll 10 to be carried in and out.

The transfer system 106 includes the housing 47 in which a pre-inspection rack 201, a post-inspection rack 202, a robot arm 3, and two sets of foreign object inspection units (processors) each including a radiation source section 41, a sensor section 42, and a holding mechanism 43 are provided. The transfer system 106, which includes two sets of foreign object inspection units, is capable of concurrently inspecting two separator rolls 10 for a foreign object. Note that each of the foreign object inspection units is controlled by a control section (not illustrated in FIG. 17).

Embodiment 7 is also configured such that the robot arm 3 holds a core 8 of a separator roll 10 from a side of a first side surface 10*b* of the separator roll 10, and each of the pre-inspection rack 201, the post-inspection rack 202, and the holding mechanism 43 holds the core 8 from a side of a second side surface 10*c* of the separator roll 10. With the configuration, the separator roll 10 can be efficiently transferred between (a) the robot arm 3 and (b) each of the pre-inspection rack 201, the post-inspection rack 202, and the holding mechanism 43 without a direct contact of each of the robot arm 3, the pre-inspection rack 201, the post-inspection rack 202, and the holding mechanism 43 with a separator 12 wound around the core 8.

(Recap of Transfer System)

As described above, the transfer system 106 in accordance with Embodiment 7 includes the housing 47 in which the pre-inspection rack 201, the post-inspection rack 202, the robot arm 3, and a plurality of foreign object inspection units are provided. Thus, it is possible to concurrently inspect a plurality of separator rolls 10 for a foreign object in the housing 47. This makes it possible to reduce a tact time required for inspection of the separator 12 for a foreign object.

The transfer system 106 can be configured to include the housing 47 in which one set or two or more sets of foreign object inspection units are provided. Alternatively, the transfer system 106 can be configured to include the housing 47 in which two or more pre-inspection racks 201, two or more post-inspection racks 202, and two or more robot arms 3 are provided.

[Recap]

A transfer system in accordance with an aspect of the present invention includes: a robot arm configured to hold a core, which is tubular, of at least one separator roll from a side of a first side surface of the at least one separator roll, the at least one separator roll including the core and a separator, wound around an outer circumferential surface of the core, for use in a battery, and take out, from a placement member on which to place the at least one separator roll, the at least one separator roll which is placed on the placement member; and a processor configured to hold the core from a side of a second side surface, opposite the first side surface, of the at least one separator roll, receive the at least one separator roll from the robot arm, and carry out a predetermined process with respect to the at least one separator roll thus received.

With the configuration, the robot arm holds the core from the side of the first side surface of the separator roll, and the processor holds the core from the side of the second side surface of the separator roll. Since the robot arm and the processor hold the core from the sides of the respective different side surfaces of the separator roll, the separator roll can be efficiently transferred between the robot arm and the processor. Further, since each of the robot arm and the processor holds the core of the separator roll, the separator roll can be transferred without a direct contact between (a) each of the robot arm and the processor and (b) the separator wound around the core.

Thus, according to the configuration, it is possible to achieve a transfer system which makes it possible to (i) efficiently transfer a separator roll while preventing adhesion of a foreign object to the separator roll and (ii) carry out a predetermined process with respect to the separator roll.

The transfer system in accordance with an aspect of the present invention can be configured such that: the core includes an outer tubular member having the outer circumferential surface and an inner tubular member provided inside the outer tubular member; the robot arm holds the core while being inserted between the outer tubular member and the inner tubular member; and the processor holds an inner circumferential surface of the inner tubular member.

With the configuration, since the robot arm holds a first part of the core and the processor holds a second part, different from the first part, of the core, the separator roll can be more efficiently transferred between the robot arm and the processor.

The transfer system in accordance with an aspect of the present invention can be configured such that the placement member is a rack configured to hold the core from the side of the second side surface of the at least one separator roll.

With the configuration, since the rack and the robot arm hold the core from the sides of the respective different side surfaces of the separator roll, the separator roll can be efficiently transferred between the rack and the processor. Further, since the rack holds the core of the separator roll, the separator roll can be placed on the rack without a direct contact between the rack and the separator wound around the core.

Thus, according to the configuration, it is possible to (i) efficiently transfer the separator roll while preventing adhesion of a foreign object to the separator roll and (ii) carry out a predetermined process with respect to the separator roll.

The transfer system in accordance with an aspect of the present invention can be configured such that the at least one separator roll which is held by the robot arm includes a plurality of separator rolls.

According to the configuration, since the robot arm holds a plurality of separator rolls, it is possible to more efficiently transfer the separator roll.

The transfer system in accordance with an aspect of the present invention can be configured such that the processor is an X-ray inspection machine configured to inspect the separator.

According to the configuration, it is possible to (i) efficiently transfer the separator roll to the X-ray inspection machine while preventing adhesion of a foreign object to the separator roll and (ii) carry out a process (e.g., defect inspection) by use of an X ray with respect to the separator roll. Further, it is possible to achieve a defect inspection machine which is inexpensive and easy to use.

A transfer method in accordance with an aspect of the present invention includes: causing a robot arm to hold a core, which is tubular, of at least one separator roll from a side of a first side surface of the at least one separator roll, the at least one separator roll including the core and a separator, wound around an outer circumferential surface of the core, for use in a battery, and take out, from a placement member on which to place the at least one separator roll, the at least one separator roll which is placed on the placement member; and holding the core from a side of a second side surface, opposite the first side surface, of the at least one separator roll, receiving the at least one separator roll from the robot arm, and carrying out a predetermined process with respect to the at least one separator roll thus received.

According to the transfer method, the separator roll can be efficiently transferred without a contact between (a) each of the robot arm and the processor and (b) the separator wound around the core.

Thus, according to the transfer method, it is possible to (i) efficiently transfer the separator roll while preventing adhesion of a foreign object to the separator roll and (ii) carry out a predetermined process with respect to the separator roll.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Transfer system
2 Rack (placement member)
3 Robot arm
4 Defect inspection device (processor, X-ray inspection machine)
8 Core
81 Outer cylindrical member (outer tubular member)
81a Outer circumferential surface
81b Inner circumferential surface
82 Inner cylindrical member (inner tubular member)
82a Outer circumferential surface
82b Inner circumferential surface
10 Separator roll
10a Outer circumferential surface
10b First side surface
10c Second side surface
12 Separator
101 Transfer system
102 Transfer system
103 Transfer system
104 Transfer system
105 Transfer system
106 Transfer system
201 Pre-inspection rack (placement member)
202 Post-inspection rack (placement member)
203 Pre-inspection rack (placement member)
204 Non-defective product rack (placement member)
205 Defective product rack (placement member)
206 Belt conveyor (placement member)
207 Pre-inspection belt conveyor (placement member)
208 Post-inspection belt conveyor (placement member)
209 Pre-inspection belt conveyor (placement member)
210 Non-defective product belt conveyor (placement member)
211 Defective product belt conveyor (placement member)

The invention claimed is:

1. A transfer system comprising:
a robot arm configured to hold a core, which is tubular, of at least one separator roll from a side of a first side surface of the at least one separator roll, the at least one separator roll including the core and a separator, wound around an outer circumferential surface of the core, for use in a battery, and take out, from a placement member on which to place the at least one separator roll, the at least one separator roll which is placed on the placement member; and
a processor configured to hold the core from a side of a second side surface, opposite the first side surface, of the at least one separator roll, receive the at least one separator roll from the robot arm, and carry out a predetermined process with respect to the at least one separator roll thus received,
the core including an outer tubular member having the outer circumferential surface and a first radial thickness, and an inner tubular member provided inside the outer tubular member and having a second radial thickness,
the robot arm holding the core while being inserted radially between the outer tubular member and the inner tubular member, and
the processor holding an inner circumferential surface of the inner tubular member.

2. The transfer system as set forth in claim 1, wherein the first radial thickness and the second radial thickness are equal.

3. The transfer system as set forth in claim 1, wherein the placement member is a rack configured to hold the core from the side of the second side surface of the at least one separator roll.

4. The transfer system as set forth in claim 1, wherein the at least one separator roll which is held by the robot arm comprises a plurality of separator rolls.

5. The transfer system as set forth in claim 1, wherein the processor is an X-ray inspection machine configured to inspect the separator.

6. A transfer method comprising:
causing a robot arm to hold a core, which is tubular, of at least one separator roll from a side of a first side surface of the at least one separator roll, the at least one separator roll including the core and a separator, wound around an outer circumferential surface of the core, for use in a battery, and take out, from a placement member on which to place the at least one separator roll, the at least one separator roll which is placed on the placement member; and
holding the core from a side of a second side surface, opposite the first side surface, of the at least one separator roll, receiving the at least one separator roll from the robot arm, and carrying out a predetermined process with respect to the at least one separator roll thus received, the core including an outer tubular member having the outer circumferential surface and a first radial thickness, and an inner tubular member provided inside the outer tubular member and having a second radial thickness, wherein holding the core includes inserting the robot arm radially between the outer tubular member and the inner tubular member, and holding the core includes holding an inner circumferential surface of the inner tubular member.

7. The transfer method as set forth in claim 6, wherein the first radial thickness and the second radial thickness are equal.

\* \* \* \* \*